US012585238B2

(12) United States Patent
Simons et al.

(10) Patent No.: US 12,585,238 B2
(45) Date of Patent: Mar. 24, 2026

(54) SYSTEMS AND METHODS FOR STANDARDIZED CONTROL OF REMOTE DEVICES WITH TERMINAL INTERFACE

(71) Applicant: PPL Services Corporation, Allentown, PA (US)

(72) Inventors: Nate Simons, Allentown, PA (US); Robert Beckett, Allentown, PA (US); Donald Vinciguerra, Allentown, PA (US); Carol Gillette, Allentown, PA (US)

(73) Assignee: PPL Services Corporation, Allentown, PA (US)

( * ) Notice: Subject to any disclaimer, the term of this patent is extended or adjusted under 35 U.S.C. 154(b) by 401 days.

(21) Appl. No.: 18/058,588

(22) Filed: Nov. 23, 2022

(65) Prior Publication Data

US 2024/0168451 A1     May 23, 2024

(51) Int. Cl.
 *G05B 19/402*          (2006.01)
(52) U.S. Cl.
 CPC .... *G05B 19/402* (2013.01); *G05B 2219/2639* (2013.01)
(58) Field of Classification Search
 CPC .......... G05B 19/102; G05B 2219/2639; H04L 67/125; G06Q 50/06
 See application file for complete search history.

(56) References Cited

U.S. PATENT DOCUMENTS

| | | | | |
|---|---|---|---|---|
| 5,980,078 A | * | 11/1999 | Krivoshein | ......... G06F 9/44505 |
| | | | | 700/1 |
| 2004/0049697 A1 | * | 3/2004 | Edwards, Jr. | ....... H04L 63/0823 |
| | | | | 726/4 |
| 2012/0029897 A1 | * | 2/2012 | Cherian | ............ H02J 13/00028 |
| | | | | 703/18 |
| 2012/0284786 A1 | * | 11/2012 | Somani | ............... H04L 63/0884 |
| | | | | 726/5 |
| 2016/0117458 A1 | * | 4/2016 | Hermans | ................ G16H 10/65 |
| | | | | 705/2 |
| 2017/0063797 A1 | * | 3/2017 | Jain | ........................ H04L 63/029 |
| 2018/0359109 A1 | * | 12/2018 | O'Hora | ............... H04L 12/2818 |
| 2019/0260838 A1 | * | 8/2019 | Berarducci | ............. H04L 63/10 |

* cited by examiner

*Primary Examiner* — Kidest Worku
(74) *Attorney, Agent, or Firm* — Haynes and Boone, LLP

(57)          ABSTRACT

A system for controlling disparate remote devices includes a control model, the control model providing a standardized interface to a user, the standardized interface providing a plurality of activities. The plurality of activities includes updating access credentials. The control module is configured to and executes commands causing the control module to communicate with a remote device, the remote device providing a remote-control interface having one or more interface types, selected from a list consisting of graphical user interface, command line interface, and menu driven interface. The control module simulates direct user interaction with the remote-control interface, translating a standardized command specifying an activity of the plurality of activities received via the standardized interface to a translated command, the translated command simulating direct user interaction with the one or more interface type.

19 Claims, 22 Drawing Sheets

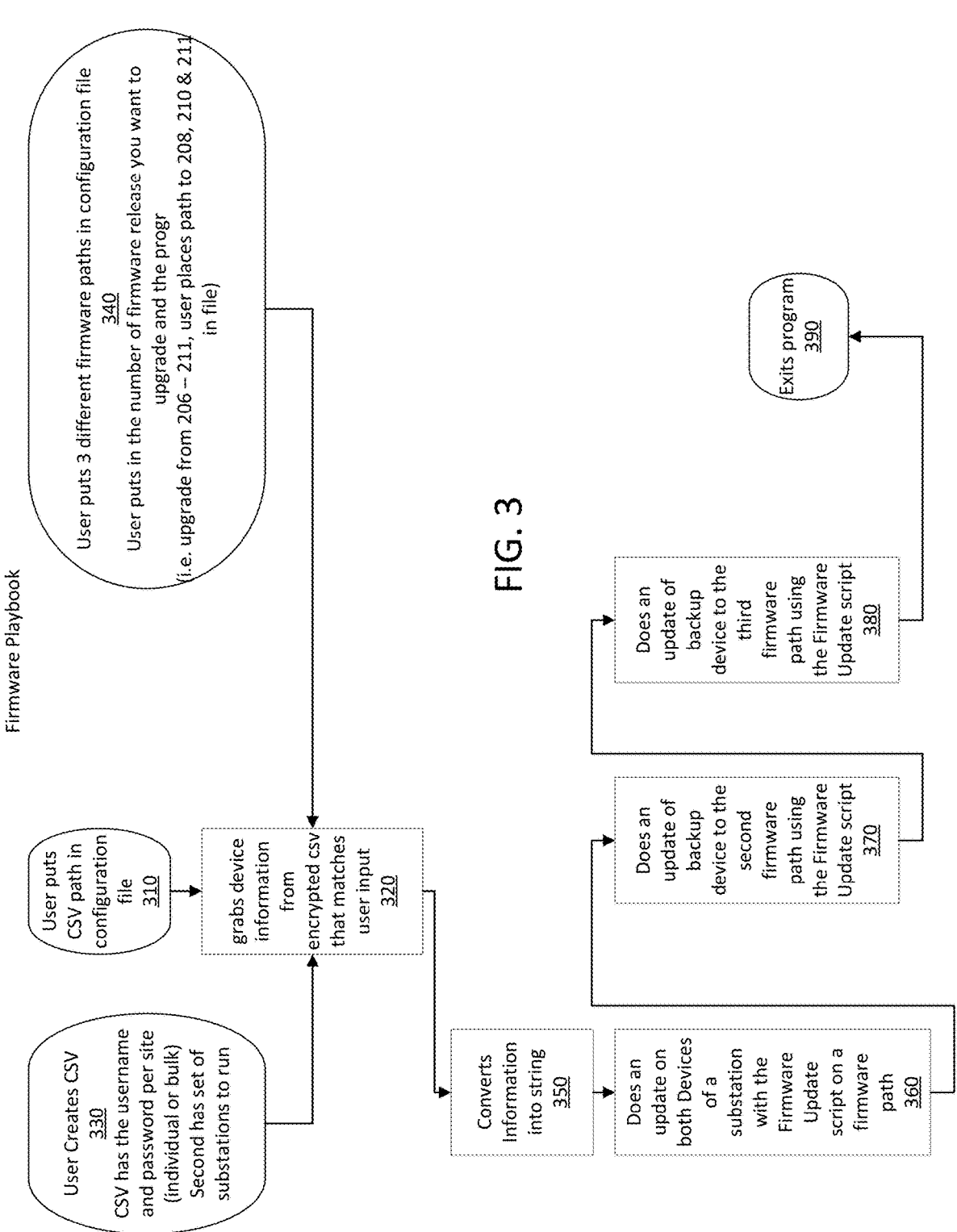

Firmware Playbook

User puts 3 different firmware paths in configuration file
340

User puts in the number of firmware release you want to upgrade and the progr (i.e. upgrade from 206 – 211, user places path to 208, 210 & 211 in file)

User puts CSV path in configuration file
310

User Creates CSV
330

CSV has the username and password per site (individual or bulk)

Second has set of substations to run grabs device information from encrypted csv that matches user input
320

Converts Information into string
350

Does an update on both Devices of a substation with the Firmware Update script on a firmware path
360

Does an update of backup device to the second firmware path using the Firmware Update script
370

Does an update of backup device to the third firmware path using the Firmware Update script
380

Exits program
390

FIG. 3

Patch Syslog

Reboot gateway

Moves to Diagnostic page 1010 → Clicks reboot button 1020 → Clicks Second Reboot button 1030 → Exits Function 1040

FIG. 11

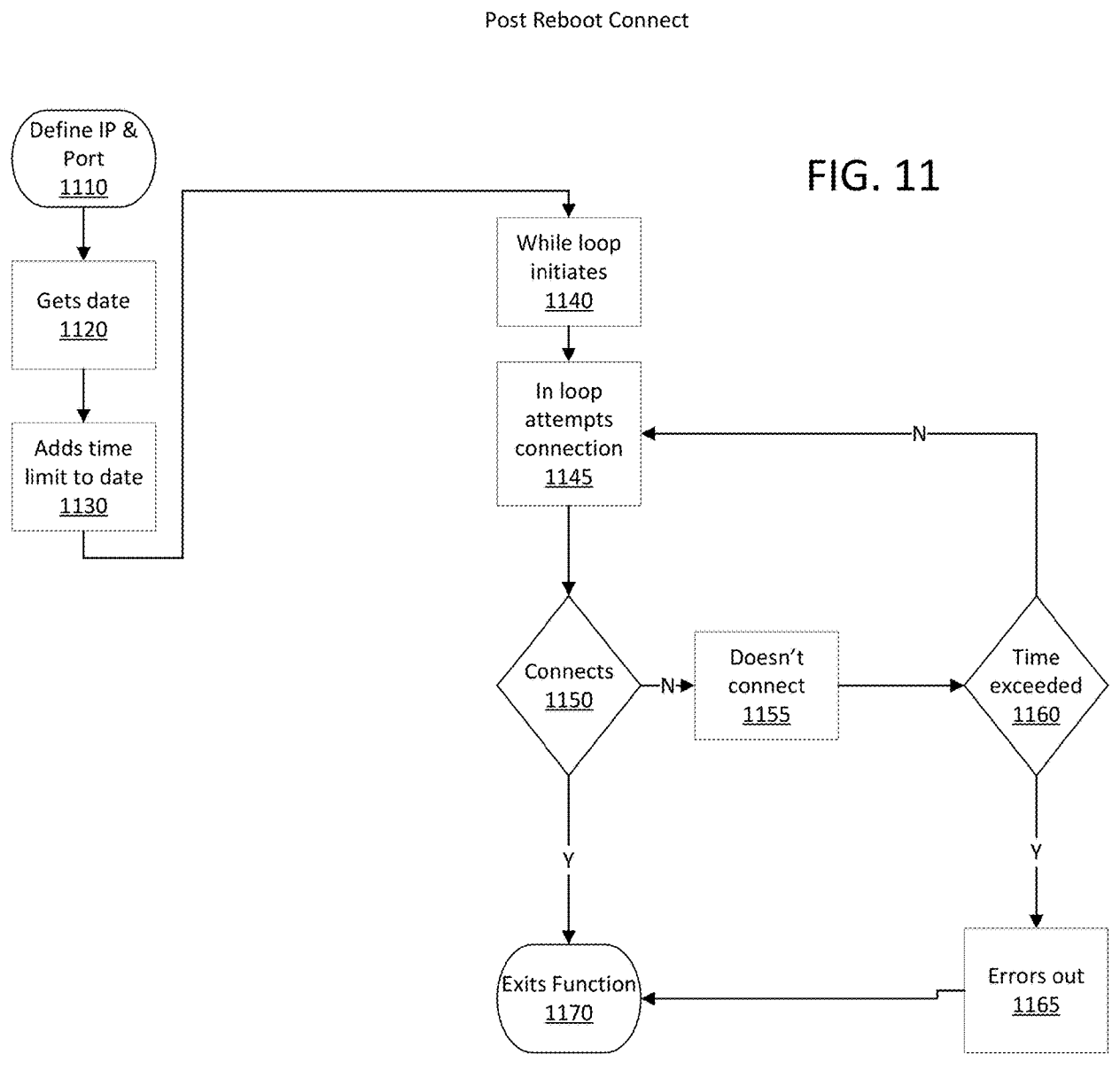

Post Reboot Connect

Define IP &
Port
1110

Gets date
1120

Adds time
limit to date
1130

While loop
initiates
1140

In loop
attempts
connection
1145

Connects 1150

N

Y

Doesn't
connect
1155

Time
exceeded
1160

N

Y

Errors out
1165

Exits Function
1170

T401L Parser Process

Login SEL Gateway via SSH 1210 → Run Who Command 1220 → Searches for Devices with T401L in name 1230 → Creates list of Devices 1240 → Logout 1250

SYSTEMS AND METHODS FOR STANDARDIZED CONTROL OF REMOTE DEVICES WITH TERMINAL INTERFACE

BACKGROUND

In power grid management, it is common to have numerous distributed gateways or other remote devices for fault protection, power metering, and other functions. Update of these systems may be tedious and may take numerous manhours to manually log in and complete updating tasks. A system that streamlines this process is desirable.

Large electrical distribution networks have devices called network gateways that link subnetworks together to make a larger network. As an entry/exit point for many devices on a network, gateways can manage many of those devices at once. Schweitzer engineering laboratories has created their own gateways which communicate to their other devices in the field and have allotted these 3620 gateways with functionality to pass through commands, retrieve information and manage settings on various devices. SEL 3620 gateway can communicate via SSH, HTTPS, FTP protocols between the user and the gateway. Some of the 3620 gateway's settings are managed using the web GUI that it hosts such as file management of the 3620 gateway and password management of the SEL devices that the gateway manages. Our applications use a web driver to login into the website of this device to create system backups, take screenshot evidence and manipulate settings when necessary. Password Cycle uses Password management page to change passwords on managed devices and the proxy reports page for evidence and password retention. The Firmware update application utilizes the File management page to upload new firmware on their system and creates evidence along the way. The user can login via an SSH protocol to the gateway that allows the user to login into the devices connected to the gateway and execute line commands on the managed device. Our T401L File Retrieval application utilizes this feature to pull all the information from the T401L to store it on a file share within the ESP.

The applications can be utilized in several different ways. The user can launch a task which is customized by a configuration file to manipulate the settings of the application launched by a task. This allows the program to run in the background on a windows server. Or the application can be launched using a GUI on the user profile. The advantage of the application is that it can be configured to maintain multiple substations at once turning thousands of clicks into 1 click via a task. It also creates an email update that have either successfully updated information or have failed in midst of the process. Along the process it creates necessary backups that can be utilized by the user to restore previous settings or have the user manually do the process in case of a failure.

The evidence gathered could be used for NERC-CIP compliance. The password cycle application could be used to show that the SEL devices are meeting rsaw 007-R5.4, 007-R5.5 and 007-R5.6 standards. by the logs and proxy reports gathered from the device. The Firmware application gathers screenshots and logs before and after an update which is required to meet RSAW 007-R3.3 for these SEL 3620 devices. Other requirements met while doing these processes basis to meet baseline requirements in CIP 010 and the backups/reports produced are a means to meet CIP 009 requirements.

BRIEF SUMMARY

In many embodiments, systems and methods herein automate several procedures that are required to meet NERC- CIP compliance or backup and maintain the infrastructure of the relay system on the electrical grid. To meet NERC-CIP compliance all cyber assets with significant enough impact require routine maintenance such as changing passwords or updating software/firmware when there is a security patch. File retention also creates a means for quick recovery in the case of losing a managed device. These tools will alleviate relay engineering's time from some basic maintenance and will reduce the likelihood of human error.

In one embodiment, a system for controlling disparate remote device includes a control model, the control model providing a standardized interface to a user, the standardized interface providing a plurality of activities. The plurality of activities include updating access credentials. The control module is configured to and executes commands causing the control module to communicate with a remote device, the remote device providing a remote-control interface having one or more interface types, selected from a list consisting of graphical user interface, command line interface, and menu driven interface. The control module simulates direct user interaction with the remote-control interface, translating a standardized command specifying an activity of the plurality of activities received via the standardized interface to a translated command, the translated command simulating direct user interaction with the one or more interface type. In one alternative, the remote device is a gateway on a power grid. In another alternative, the remote device is an IoT gateway. Alternatively, the gateway collects information on energy distribution. In another alternative, the gateway is part of a smart grid.

In one embodiment, a method of controlling disparate remote devices includes providing a standardized interface to a user through a control module, the standardized interface providing a plurality of activities, the plurality of activities including update access credentials. The method further includes communicating via the control module with a remote device, the remote device providing a remote-control interface having one or more interface types, selected from a list consisting of graphical user interface, command line interface, and menu driven interface. The method further includes simulating direct user interaction with the remote-control interface by translating a standardized command specifying an activity of the plurality of activities received via the standardized interface to a translated command, the translated command simulating direct user interaction with the one or more interface type. In one alternative, the remote device is a gateway on a power grid. Alternatively, the remote device is an IoT gateway. In another alternative, the gateway collects information on energy distribution. Alternatively, the gateway is part of a smart grid.

In another embodiment, a system for controlling disparate remote devices includes a control model, the control model providing a standardized interface to a user, the standardized interface providing a plurality of activities, the plurality of activities including update access credentials. The control module is configured to communicate with a first remote device, the first remote device providing a first remote-control interface having a first one or more interface types, selected from a list consisting of graphical user interface, command line interface, and menu driven interface. The control module is further configured to simulate a first direct user interaction with the first remote-control interface, translating a first standardized command specifying an activity of the plurality of activities received via the standardized interface to a first translated command, the first translated command simulating direct user interaction with the first one or more interface type. The control module is further configured to communicate with a second remote device, the second remote device providing a second remote-control interface having a second one or more interface types, selected from the list consisting of graphical user interface, command line interface, and menu driven interface. The control module is further configured to simulate a second direct user interaction with the second remote-control interface, translating the first standardized command specifying the activity of the plurality of activities received via the standardized interface to a second translated command, the second translated command simulating direct user interaction with the second one or more interface type. Alternatively, the remote device is a gateway on a power grid. In one alternative, the remote device is an IoT gateway. Alternatively, the gateway collects information on energy distribution. In another alternative, the gateway is part of a smart grid. Alternatively, the first remote device and the second remote device are designated to be communicated with in response to a selection of an activity of the plurality of activities according to a list associated with the activity. In another alternative, the first one or more interface types and the second one or more interface types are the same and the list provides for a repetition of simulating direct user action.

In one embodiment, a method of controlling disparate remote devices includes providing a standardized interface to a user through a control module, the standardized interface providing a plurality of activities, the plurality of activities including update access credentials. The method further includes communicating via the control module with a first remote device, the first remote device providing a first remote-control interface having a first one or more interface types, selected from a list consisting of graphical user interface, command line interface, and menu driven interface. The method further includes simulating direct user interaction with the first remote-control interface by translating a first standardized command received via the standardized interface to a first translated command, the first translated command simulating direct user interaction with the first one or more interface type. The method further includes communicating via the control module with a second remote device, the second remote device providing a second remote-control interface having a second one or more interface types, selected from the list consisting of graphical user interface, command line interface, and menu driven interface. The method further includes simulating direct user interaction with the second remote-control interface by translating the first standardized command received via the standardized interface to a second translated command, the second translated command simulating direct user interaction with the second one or more interface type.

In another embodiment, system for teaching a standardized interface to control disparate remote devices includes a control model, the control model providing a standardized interface to a user, the standardized interface providing a plurality of activities, the plurality of activities including update access credentials. The control module is configured to communicate with a remote device, the remote device providing a remote-control interface having one or more interface types, selected from a list consisting of graphical user interface, command line interface, and menu driven interface. The control module is further configured to simulate direct user interaction with the remote-control interface, translating a standardized command specifying an activity of the plurality of activities received via the standardized interface to a translated command, the translated command simulating direct user interaction with the one or more interface type. The control module is further configured to enter into an activity teaching mode, the activity teaching mode providing a teaching interface to the user. The teaching interface is configured to receive a request for a new remote device to be added. The teaching interface is configured to activate a teaching record, wherein the user navigates the new remote device via a new remote-control interface and the activity teaching model configures the control module to perform at least one of the plurality of activities at the new remote device.

In another embodiment, a system for updating a plurality of remote devices includes a control model, the control model providing a standardized interface to a user, the standardized interface providing a plurality of activities. The control module is configured to when a first activity of the plurality of activities is executed by a user on the control module in relation to a first remote device, changing a first configuration of the first remote device, to detect that a second remote device is required to be modified as well, thereby changing the first configuration on the second remote device.

BRIEF DESCRIPTION OF THE FIGURES

FIG. 3 shows one embodiment of a Firmware Playbook for a SCORDTI system;

FIG. 11 shows a post reboot connection scenario;

DETAILED DESCRIPTION

Certain terminology is used herein for convenience only and is not to be taken as a limitation on the embodiments of the systems and methods of standardized control of remote devices with terminal interface (hereinafter SCORDTI). Embodiments of SCORDTI includes accessing a remote terminal using standardized commands. To do this the SCORDTI system translate a command issued by the user into simulated user commands that interact with the remote terminal, typically a gateway or other remote system.

Figure 1:
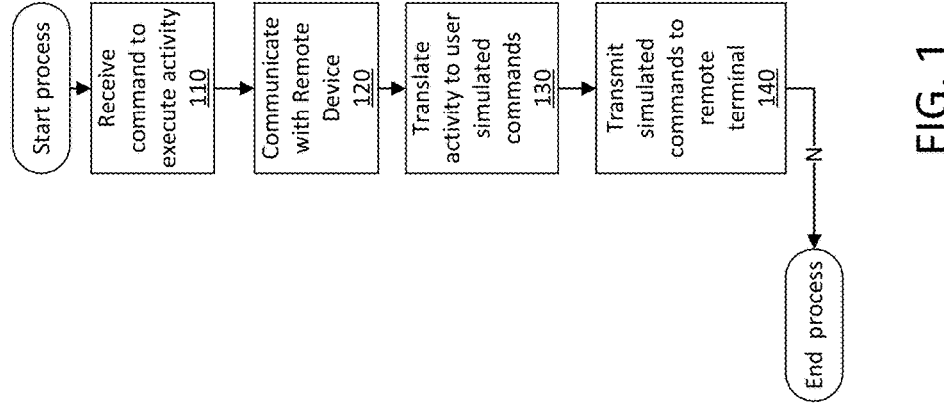
FIG. 1 shows one embodiment of a SCORDTI method.

FIG. 1 shows one embodiment of a SCORDTI method. In many configurations, a user interacts with a module. The user in step 110 may provide a command to the module to execute an activity. There are many different types and kinds of applicable activities. In the context of power transmission, one such activity may be to check fault statuses of one or more devices. In many configurations, an activity may be to update information on various gateways, such as passwords. Such activities include at least any of the activities described herein. The module in step 110 receives the command. Subsequently, in step 120 the module communicates with a remote device. This communication typically occurs over a private or public network, including such networks as the Internet. A variety of communication routes may be utilized depending on how the remote device is set to communicate. Wireless communication systems are certainly included and communication over radio or cellular phone networks is contemplated. The remote device typically includes a communication protocol for access. In many configurations, the remote device may provide for remote access of the user via a graphical user interface, command line interface, and menu driven interface or other interface. Many times, these interfaces are accessible via worldwide web/Internet communication. The interfaces may be the result of legacy systems that are not easily updated. In step 130 the module translates the command to execute an activity to simulated user actions that are designed to accomplish the desired activity (simulated commands). In step 140 the simulated commands are transmitted to the remote terminal and the terminal accordingly conducts the desired activity. In this way, a remote terminal, which would ordinarily require access and login by a user using the protocol of the terminal, a standard interface via the module may be used. This may save the user time and the effort of understanding multiple languages or techniques for interacting with terminals.

Figure 2:
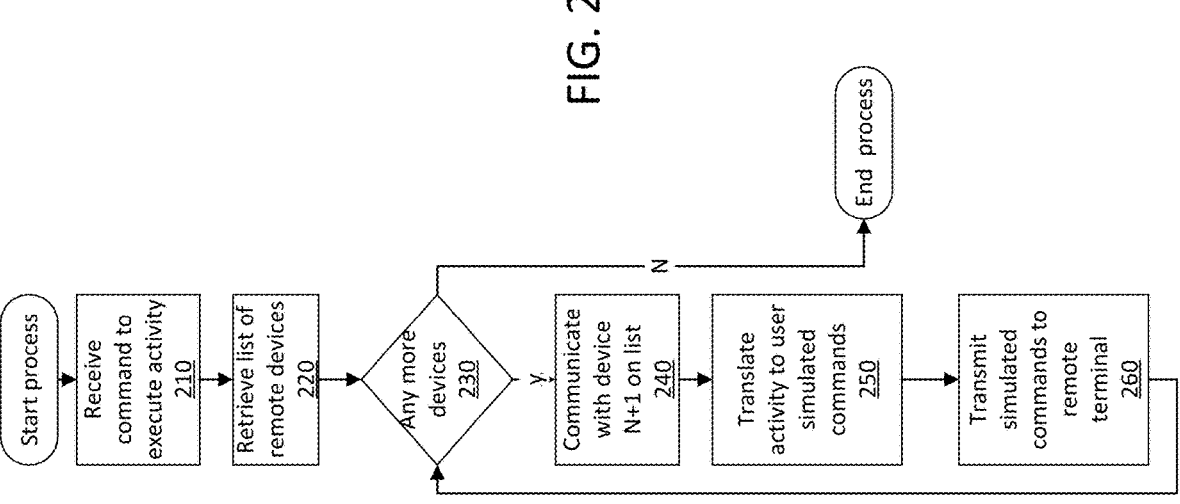
FIG. 2 shows another embodiment of SCORDTI method.

FIG. 2 shows another embodiment of SCORDTI method. Similar to the previous method, in step 210, the module receives a command from a user to execute a particular activity. In step 220, the module retrieves a set of remote devices to which the command applies. In step 230, the module determines whether any more devices need to be commanded. If not the procedure continues to step 240 where the module communicates with the next device on the list. In step 250, the module then translates the user command to a simulated command, the simulated command simulating remote access of the user via a graphical user interface, command line interface, and menu driven interface or other interface. Then the simulated commands are transmitted to the remote terminal and the remote device is controlled in step 260. Then the flow returns to step 230 where it is determined whether any more devices are on the list responsive to the command. In this method, the various remote devices may offer the same type of interface at the remote terminal or a different interface. The module determines the interface and customizes the commands in order to communication.

In many embodiments of SCORDTI modules, the system may be trained. In this way, the module may be trained to receive commands and accordingly conduct various activities. In order to train the module, a user may guide the module through interaction with a remote device using the remote interface. In some embodiments, the system builds the simulated commands based on the actions taken by the user in relation to a particular remote device. In some embodiments, the system builds the simulated commands based on the actions taken by the user in relation to a class of remote devices. In some embodiments, the system determines the interaction methodology using artificial intelligence.

FIG. 3 shows one embodiment of a Firmware Playbook for a SCORDTI system. In many configurations, the playbook is essentially a drag and drop queue system where users can create their own pushes to the gateways with a number of possibilities, including but not limited to a firmware update, port mapping update, syslog configuration, radius configuration, password cycle and any other blanket configuration changes. The playbook system (or module) essentially takes a list of devices and the configurations that would like to have a change or update pushed to and put them in a queue. If there are previous queue entries that are running a configuration change on a sublist of the devices in the new queue, the new queue would wait until those configuration changes are complete on all devices and then apply the queue's update if the previous queue finishes early enough in the workday. If the previous queue could not finish by the end of the workday or other time period, the system sends an email or other notification saying that it will start its job the next day at the start of the workday. In this way if there are any problems, they would occur during the workday letting the utility have the optimal people on staff to deal with the potential issues. In step 310, the user may put a CSV path (comma separated values) in a configuration file. Alternatively, in step 330, the user may create a CSV. Additionally, in step 340 the user may put three different firmware paths in the configuration file. Regardless of the source of the path or CSV information, in step 320, the system includes an encrypted CSV from which the system captures information matching the user's input. In step 350, the system converts the captured information to a string. In step 360, the system does an update on both devices of a substation with the firmware update script on the firmware path. In step 370, the system does an additional update of a backup device to the second firmware update path using the Firmware update script. In step 380, the system does an additional update of a backup device to the third firmware update path using the Firmware update script. In this way, a system may follow three different firmware paths to update three different devices on the network.

In many configurations, it is desirable to update the password of various devices using a script. In some configurations, the password update operates within NERC (North American Electric Reliability Corporation) requirements. Various types of regulatory entities may require password update procedures. Examples of NERC standards include the below NERC standards (specifically NERC CIP-007 requiring all high or medium Bulk Electric System (BES) assets have their passwords rotated at least once every 15 calendar months).

| SYSTEM ACCESS CONTROL | | | |
| --- | --- | --- | --- |
| Part | Applicable Systems | Requirements | Measures |
| 5.6 | High Impact BES Cyber Systems and their associated: 1. EACMS; 2. PACS; and 3. PCA | Where technically feasible, for password-only authentication for interactive user access, either technically or procedurally enforce password changes or an obligation to change the password at least once every 15 calendar months. | Examples of evidence may include, but are not limited to: System-generated reports or screen-shots of the system-enforced periodicity of changing passwords; or Attestations that include a reference to the documented procedures that were followed. |

Figure 4:
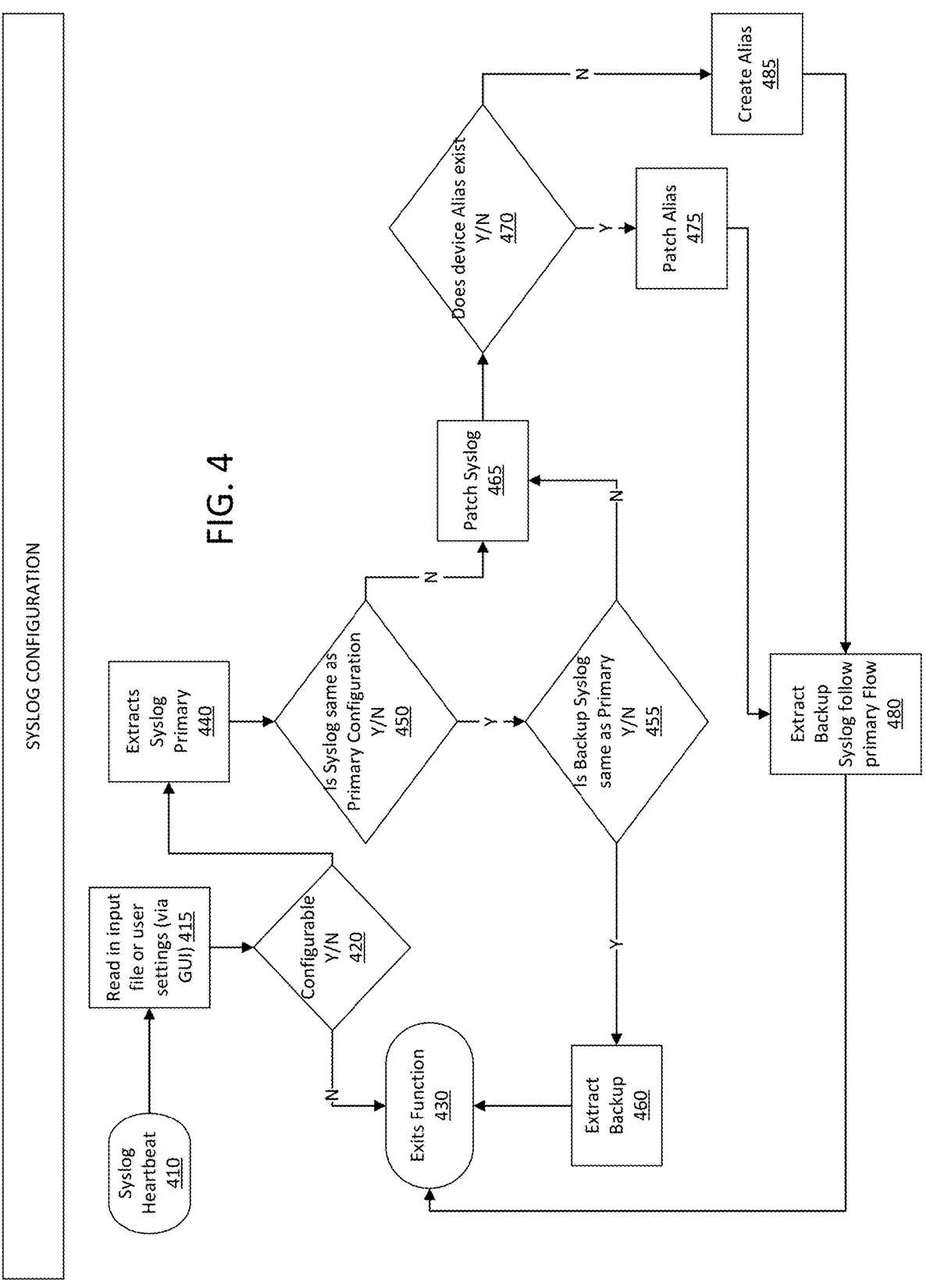
FIG. 4 shows a method of syslog configuration.

FIG. 4 shows a method of syslog configuration. This method is targeted at determining whether the syslog matches the primary syslog and then updating any aliases that need to be updated. In step 410, it is determined whether the system log is still active and working via Syslog Heatbeat detection procedures. This helps determine whether a remote device is still active. The syslog (or system log) typically has some record of the communication protocols of a particular remote device in question. In step 420, it is determined whether a remote device that is being interacted with is configurable. If the remote device not configurable, then in step 430, Radius configuration is begun (The Remote Authentication Dial-In User Service). If the remote device (typically a gateway) is configurable, then in step 440, the primary system log is extracted. If the syslog is the same as the Primary Configuration (in step 450) then the flow proceeds to step 455. In step 455 the Syslog is compared to the Backup Configuration. Thereafter, the backup is extracted in step 460 and the flow proceeds to step 430. If the syslog is not the same as the Primary Configuration, then the syslog is patched in step 465. It is further determined whether an Alias exists for the syslog in relation to the remote device. If yes, then the existing Alias is patched in step 475. If not, then an Alias is created in step 485. In any case, the flow proceeds to step 480 where the backup syslog is extracted and the primary flow is followed.

Figure 5:
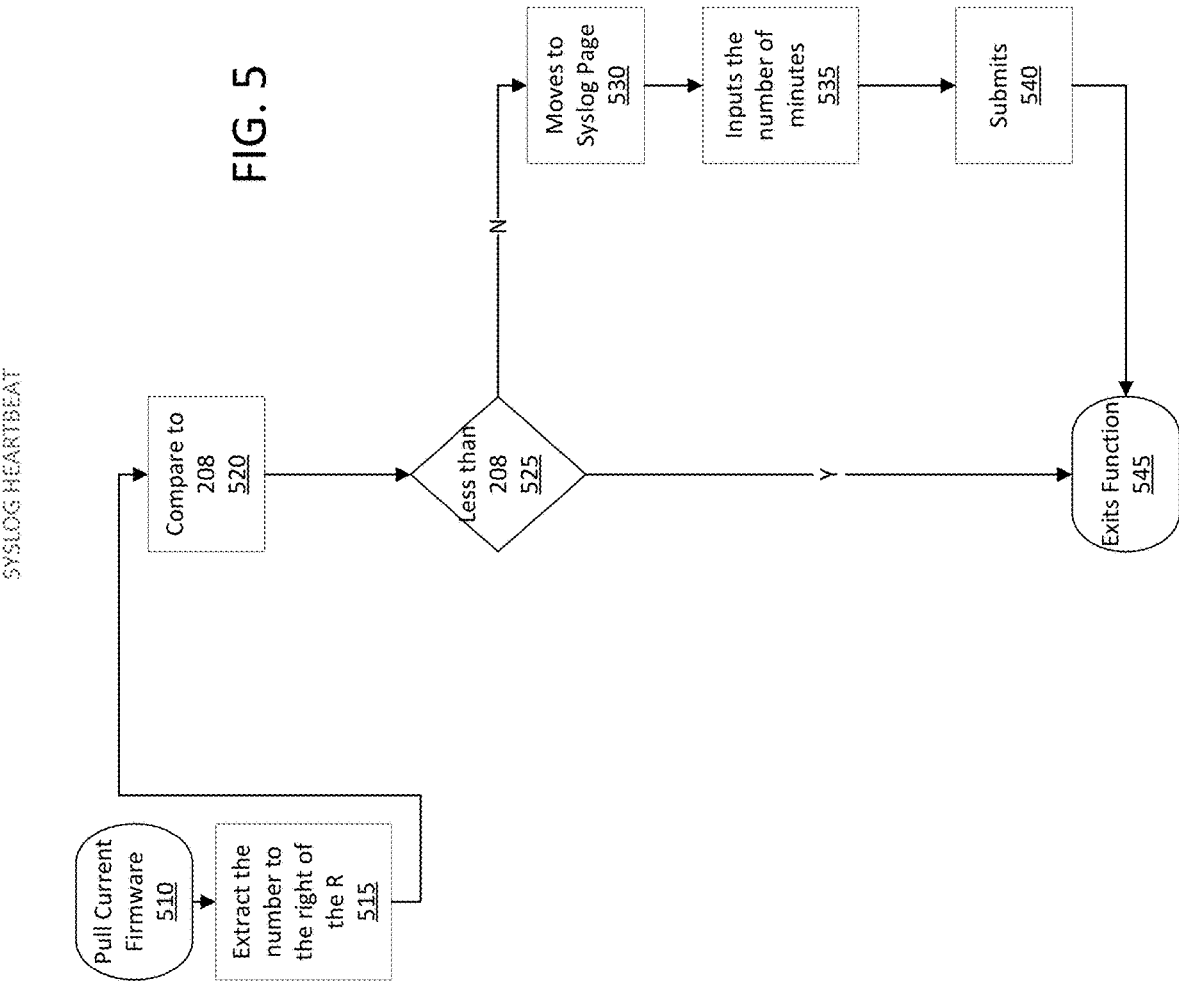
FIG. 5 shows more information concerning the Syslog Heartbeat of the FIG. 4.

FIG. 5 shows more information concerning the Syslog Heartbeat of the FIG. 4. In step 510, the system pulls the current firmware. In step 515 the number to the right of the R is extracted, which represents the revision number. In step 210, this is compared to 208. If the number extracted is less than 208, then the function is exited in step 545. The number 208 here refers to the version number of the firmware. In alternatives, other comparisons may be used. At least one aspect of this is to determine whether the current version supports Syslog Heartbeat. If not, then the firmware version is moved the Syslog page in step 530. In step 535 the number of minutes are input and is step 540, this is submitted to the Syslog.

Figure 6:
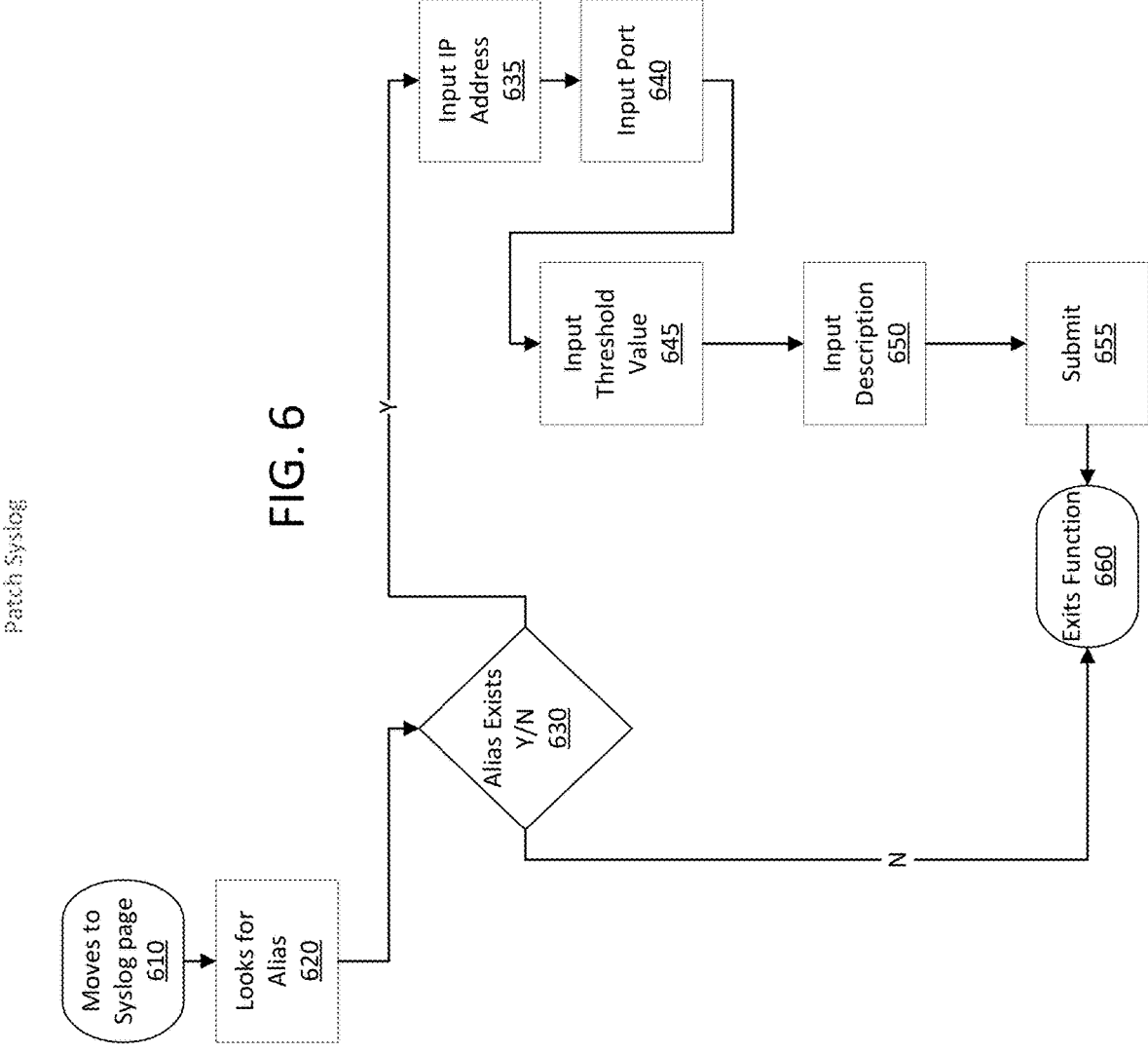
FIG. 6 shows a method for patching the Syslog.

In FIG. 6, a method for patching the Syslog is shown. In step 610, the system moves the Syslog page. In step 620, the system looks for an Alias. If an Alias does not exist, then in step 630 the system proceeds to step 660 and the function exits. If an Alias does exist, then it is updated with the IP address in step 635. In step 640 the port is input. In step 645 the threshold value is input. In step 650, a description is input and in step 655 these are submitted by the user.

Figure 7:
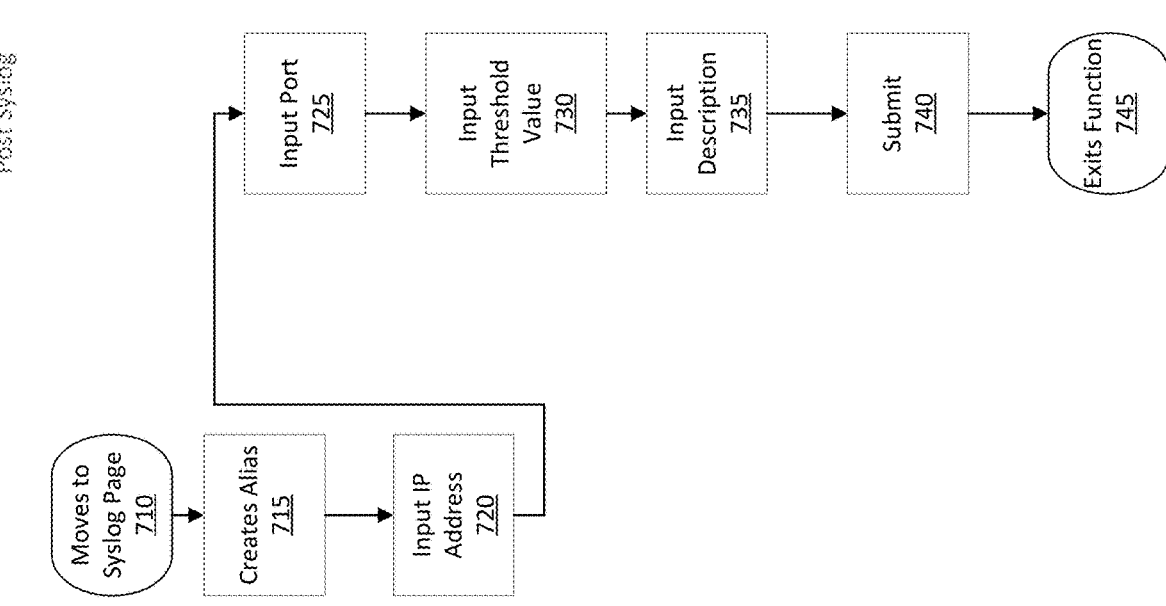
FIG. 7 shows a method for posting to the Syslog.

FIG. 7 shows a method for posting to the Syslog. Essentially, this method is the same as the method of patching the Syslog, only there is no need to look for an Alias. In step 710, the system moves the Syslog page. In step 720 an Alias is created. The user may then input the IP address in step 720. In step 725 the port is input. In step 730 the threshold value is input. In step 735, a description is input and in step 740 these are submitted by the user. Then the functions exists in step 645.

Figure 8:
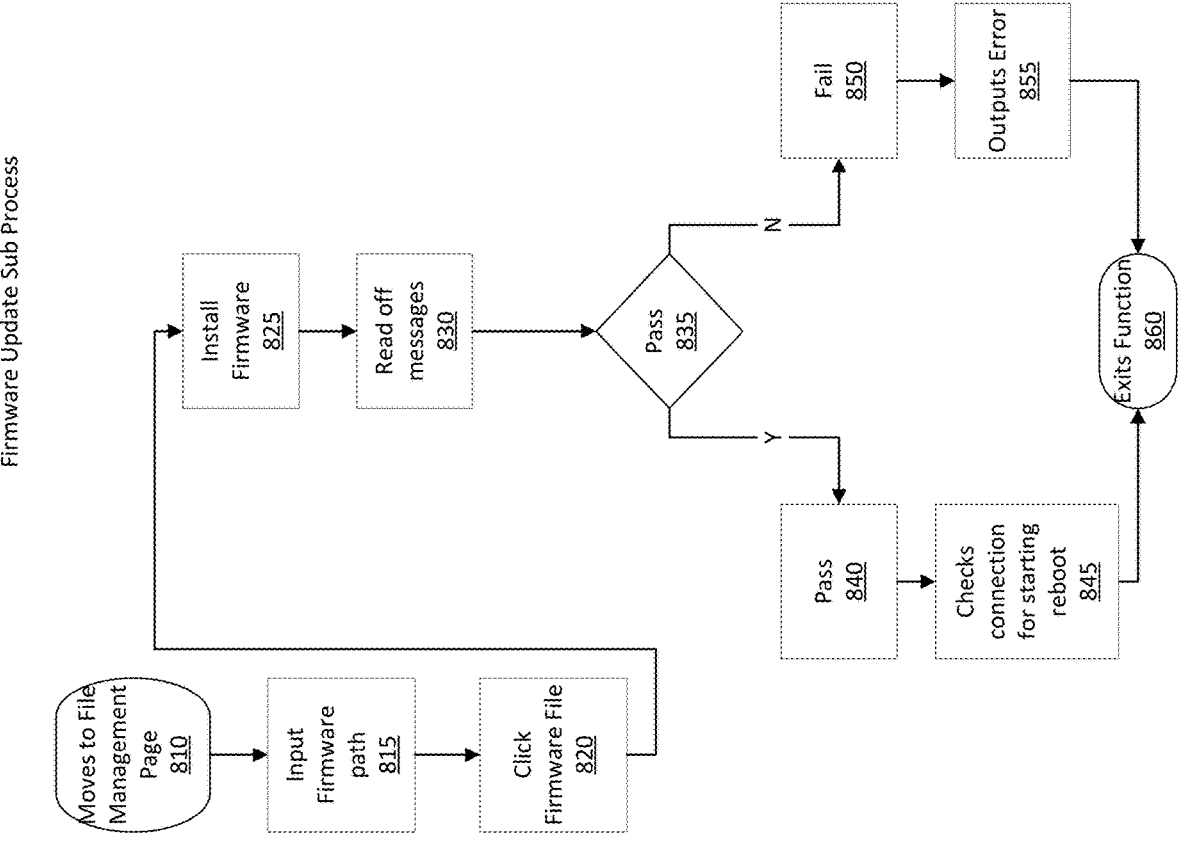
FIG. 8 shows a firmware update sub process.

FIG. 8, the firmware update sub process is shown. In step 810, the user moves to the file management page. In step 815, the firmware path is input. Then the user in step 820 clicks the firmware file. In step 825, the firmware is installed. In step 830, the messages concerning the firmware install are read off. In step 835, it is determined whether a pass has occurred. If so, the method advances to step 840. In step 840 if a pass has occurred then, the connected is checked for a reboot in step 845. If the firmware install fails in step 850, then in step 855 the error is output and the function exist in step 860.

Figure 9:
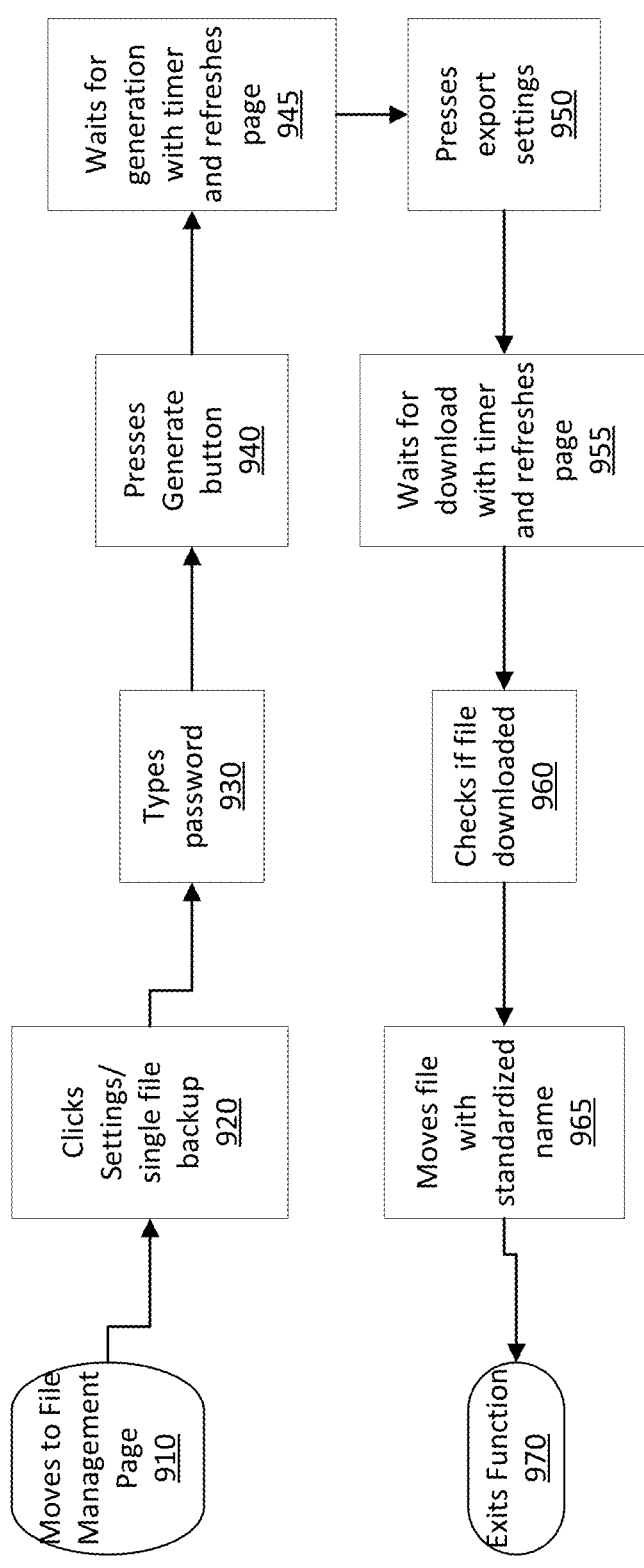
FIG. 9 shows a procedure for exporting setting.

FIG. 9 shows a procedure for exporting setting. In step 910, the user moves to a file management page. In step 920, the user selects of click the settings/single file backup selection. In step 930, the user types in a password. In step 940, the user actuates the generate button. In step 945, the system waits for generation with a timer and then the user refreshes the page. The in step 950, the user presses export settings. In step 955, the user waits for a download and then refreshes the page. In step 960, the user may check if the file has downloaded. In step, 965 the system may move the file with a standardized name. Then in step 970, the function exits.

Figure 10:
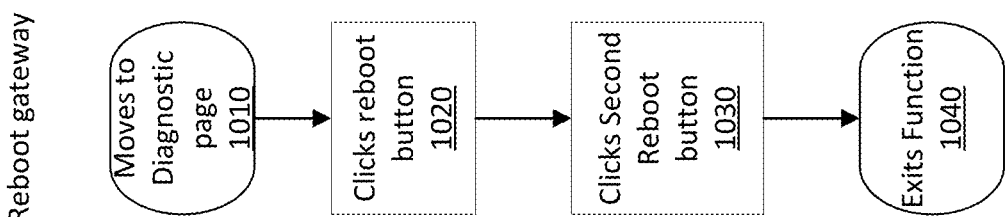
FIG. 10 shows a reboot gateway.

FIG. 10 shows a reboot gateway. After a firmware update, the system may move to a diagnostic page. In step 1020 a first reboot button is clicked. In step 1030 a second reboot button is clicked and the system of the gateway may reboot. In step 1040 the function exits.

FIG. 11 shows a post reboot connection scenario. In step 1110, the IP address and port are defined. In step 1120, the system gets the date. In step 1130, the system adds a time limit to the date. Then the system attempts to connect for the time and date limit according to a while loop initiated in step 1140. In step 1145 the loop attempts connection. When the loop connects in step 1150 the function proceeds to exit in step 1170. If the system doesn't connect in step 1155 the procedure proceeds to step 1160 where it is checked if the time has been exceeded. If not, the loop proceeds to step

1145 and continues to attempt connection. Otherwise in step 1165 the loop errors out if the time has been exceeded. Then the system exits in step 1170.

Figure 12:
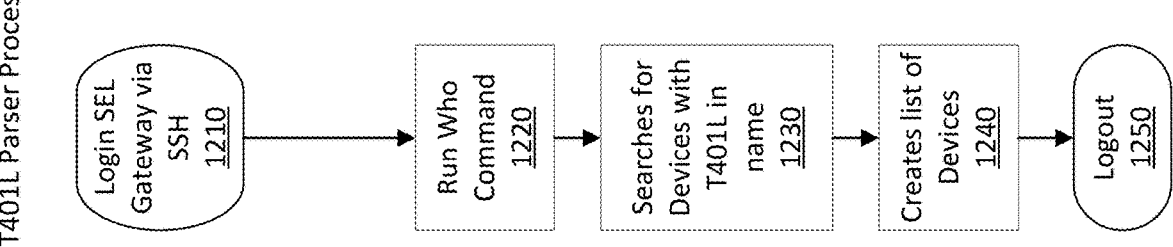
FIG. 12 shows one embodiment of an exemplary T401L Parser Process.

FIG. 12 shows one embodiment of a T401L Parser Process. SEL-T401L is a high-performance, easy-to-use line protective relay in a 3 U package. In step 1210, the user logs in to the SEL Gateway via a Secure Socket Shell (SSH). In step 1220, the system runs the command Who. The system then searches for devices with T401L in the name in step 1230. In step 1240, the system creates a list of devices. In step 1250, the system logs out.

Figure 13:
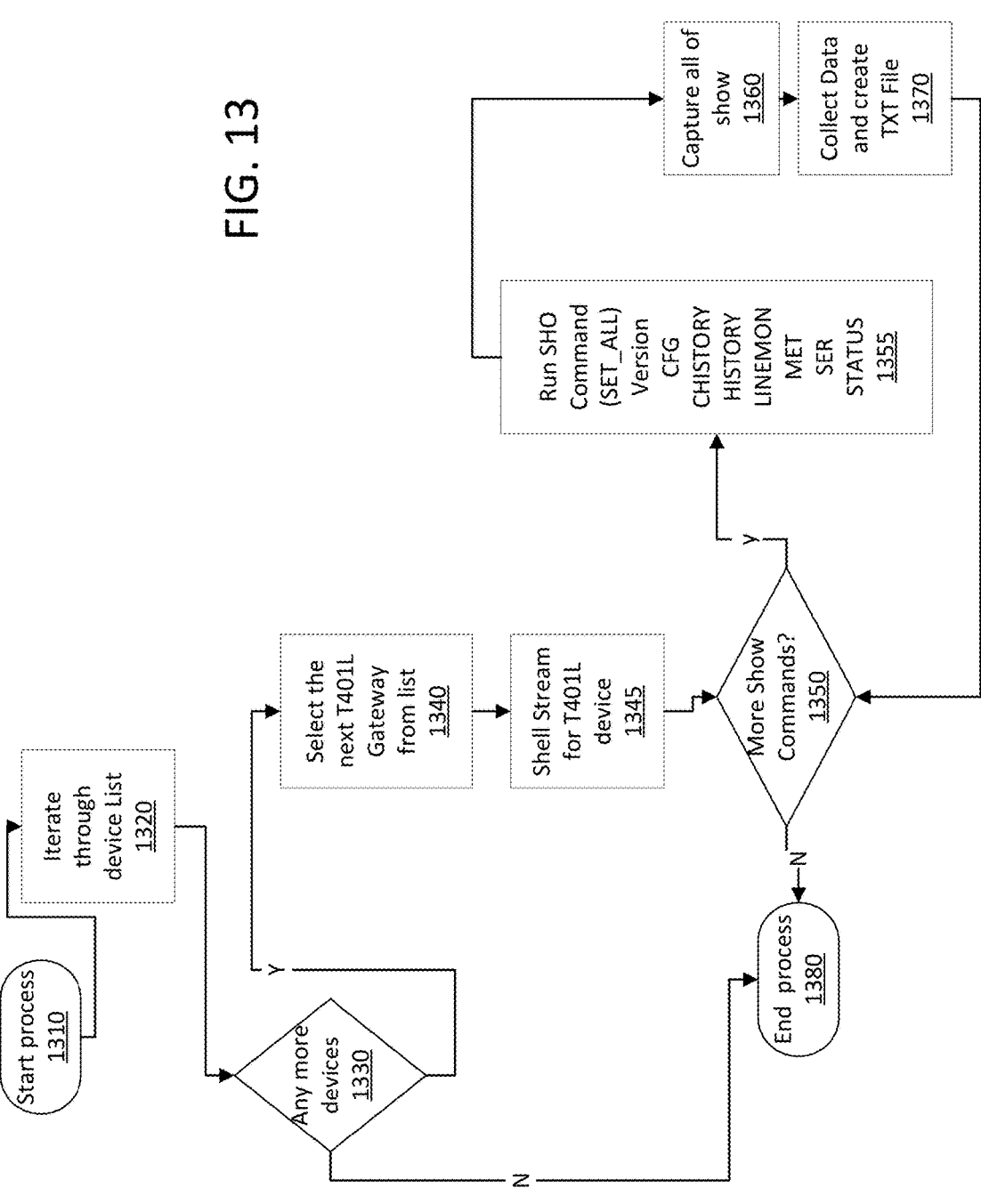
FIG. 13 shows an embodiment of an exemplary T401L File Grabbing Process.

FIG. 13 shows an embodiment of a T401L File Grabbing Process. In step 1310 the process is started. In step 1320, the systems iterates through a device list. The device list typically includes the devices to be updated or managed together. In step 1330 it is checked to see if there are any more devices to iterate through. If not, the process ends in step 1380. Otherwise in step 1340 the next T401L gateway is selected from the list. Note that the method may work with other gateways or remote devices and the specific gateway is merely commonly used in electrical grids for protective relay. In step 1345, commands are steamed from the host that the user is typically operating to the gateway (Shell Stream). In step 1350, the user may show more commands to operate the gateway. In step 1355, the system runs show commands and the commands for the device are shown. The system then captures all of the shown commands in step 1360. In step 1370, the data is collected and a text file is created. If there are more commands to show, then the process repeats. Otherwise, the process ends in step 1380.

Figure 14:
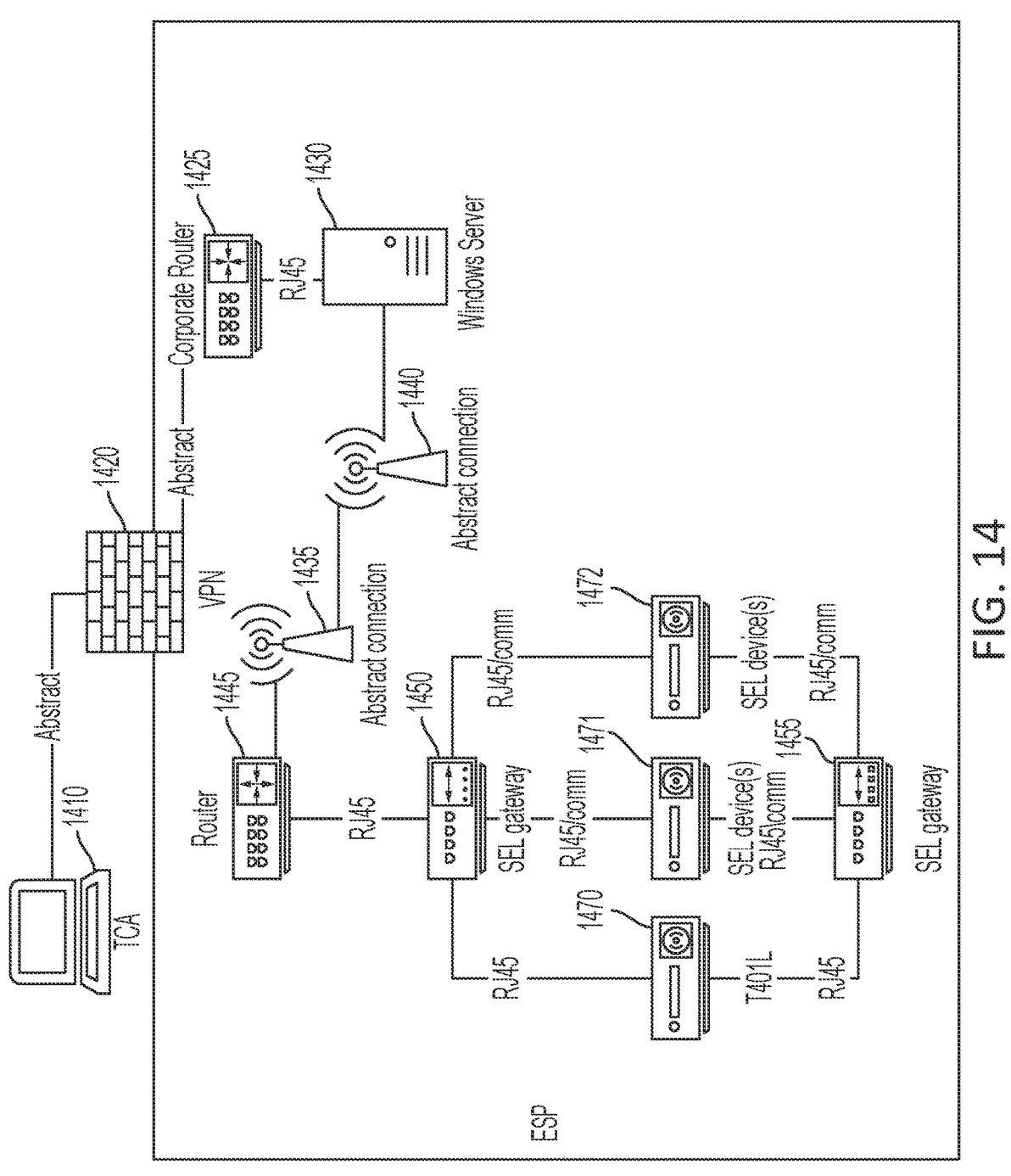
FIG. 14 shows one embodiment of a system setup using a SCORDTI.

FIG. 14 shows one embodiment of a system setup using a SCORDTI. Typically, the system of FIG. 14 functions within a power distribution system. A user may access and control the system via remote terminal 1410. This terminal is typically located in an office or other location and may include a variety of computing systems. The remote terminal 1410 accesses the VPN 1420 of the power distribution system. Various login and connection techniques may be used. The VPN 1420 typically includes a corporate router 1425. Windows server 1430 may control and distribute network traffic in conjunction with corporate router. Various communications networks 1440, 1435 may be used to communicate with a remote router 1445 that routes traffic to an SEL gateway 1450. Communications networks 1440, 1435 may be wireless or wired, including ethernet, cellular communication, WiFi, etc. Typically, there is a redundant (or backup) SEL gateway 1455 as well. This necessitates the dual update of passwords or other information on both gateways as discussed in various places above. Note that these gateways need not specifically be SEL gateways. Any gateways providing for implementation of security and access may be utilized. The gateways provide access to a variety of devices that provide for microgrid power management include devices 1470, 1471, 1472. A variety devices may be used for devices 1470, 1471, 1472, including power measurement devices, broken conductor detectors, fault detectors and various other devices used in a power grid. These devices are commonly provided by Schweitzer Engineering Laboratories (SEL) but alternatives may be used. FIG. 14 conceptually describes layer 1 and layer 2 (physical and datalink).

Figure 15:
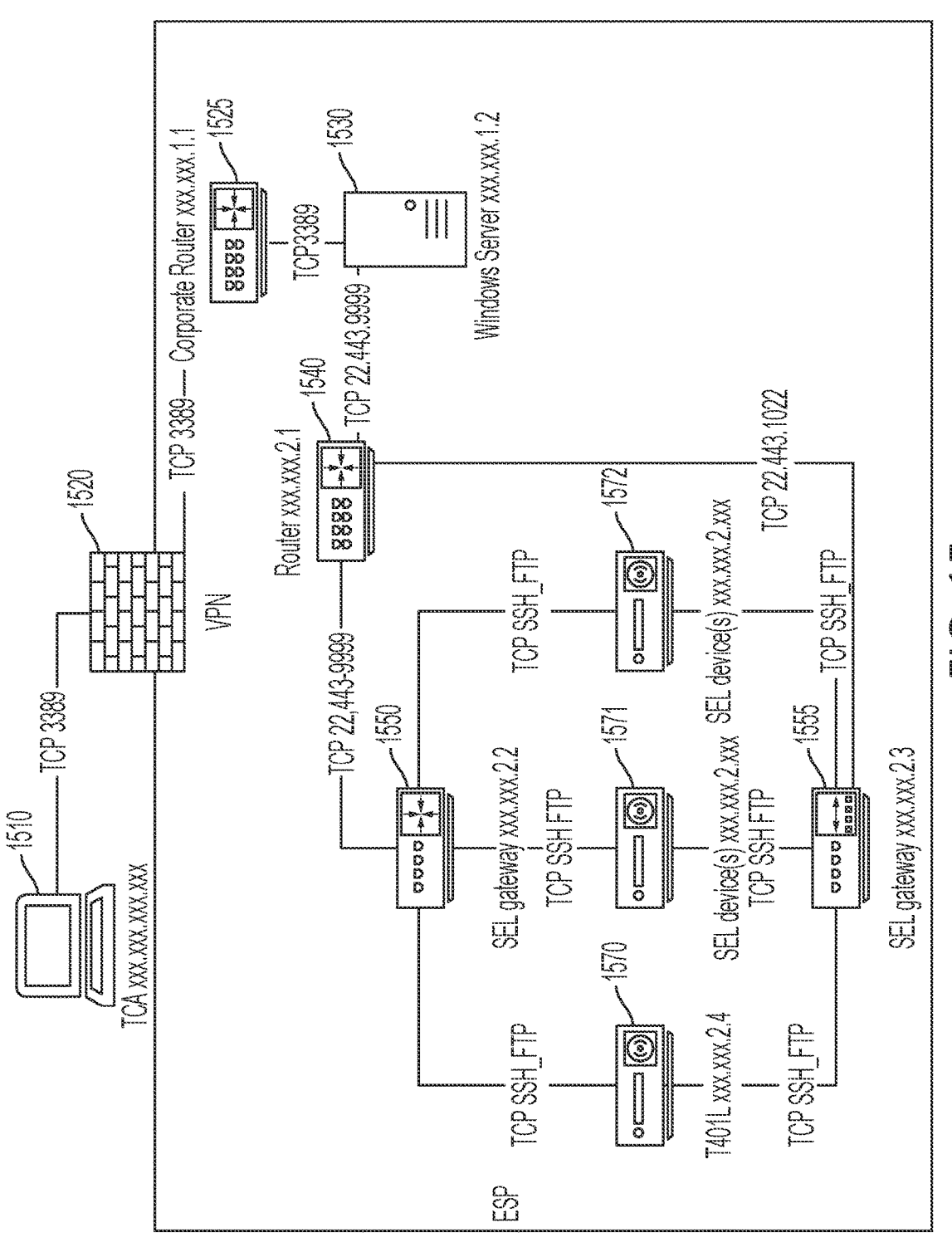
FIG. 15 shows another embodiment of a system setup using a SCORDTI.

FIG. 15 shows one embodiment of a system setup using a SCORDTI. As opposed to FIG. 14, this shows layers 3 and 4 (network and transport). Typically, the system of FIG. 15 functions within a power distribution system. A user may access and control the system via remote terminal 1510. This terminal is typically located in an office or other location and may include a variety of computing systems. The remote terminal 1510 accesses the VPN 1520 of the power distribution system. Various login and connection techniques may be used. The VPN 1520 typically includes a corporate router 1525. Windows server 1530 may control and distribute network traffic in conjunction with corporate router. The system communicates with remote router 1540 that routes traffic to an SEL gateway 1550. Typically, there is a redundant SEL gateway 1555 as well. This necessitates the dual update of passwords or other information on both gateways as discussed in various places above. The gateways provide access to a variety of devices that provide for microgrid power management include devices 1570, 1571, 1572. A variety of devices may be used for devices 1470, 1471, 1472, including power measurement devices, broken conductor detectors, fault detectors and various other devices used in a power grid, similar to FIG. 14.

Figure 16:
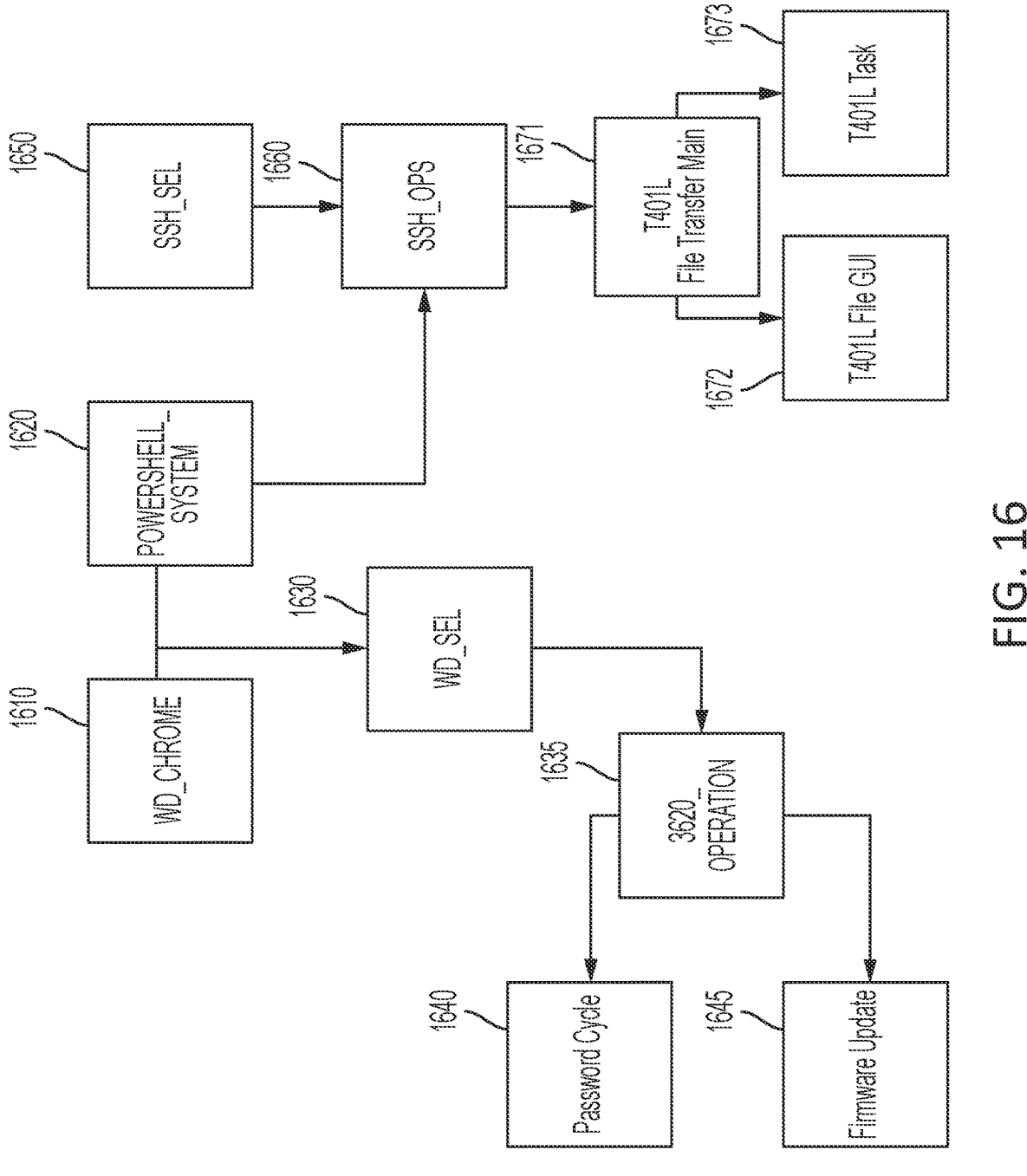
FIG. 16 shows various embodiments of modules that may operate within the systems including a SCORDTI.

FIG. 16 shows various modules that may operate within the systems including a SCORDTI. WD Chrome module 1610 provides for access to the system via a chrome interface, while Powershell system 1620 allows for access through a powershell based system. Various access modules are possible. These modules may access WD SEL 1630, which is a workday access module. This module may access 3620 operations 1635 or a variety of other types of modules. 3620 SEL is an example of an ethernet gateway and a variety of other gateways may be used. This module may implement various other modules, such as password cycle 1640 or firmware update 1645 that provide for the updating of firmware and passwords respectively. This updating may occur for a wide variety of gateways or other remote modules according to the techniques discussed above. In this way, a user accessing one of these modules need not update each gateway or other remote device individually. Access to various data may also be achieved through the powershell 1620 or the SSH SEL (Secure Shell SEL) module 1650. Access to SSH operations 1660 is thereby activated and modules such as the file transfer main 1670, the file GUI (graphically user interface) module 1671, or the task module 1672 may be accessed to recover data from remote devices.

Figure 17:
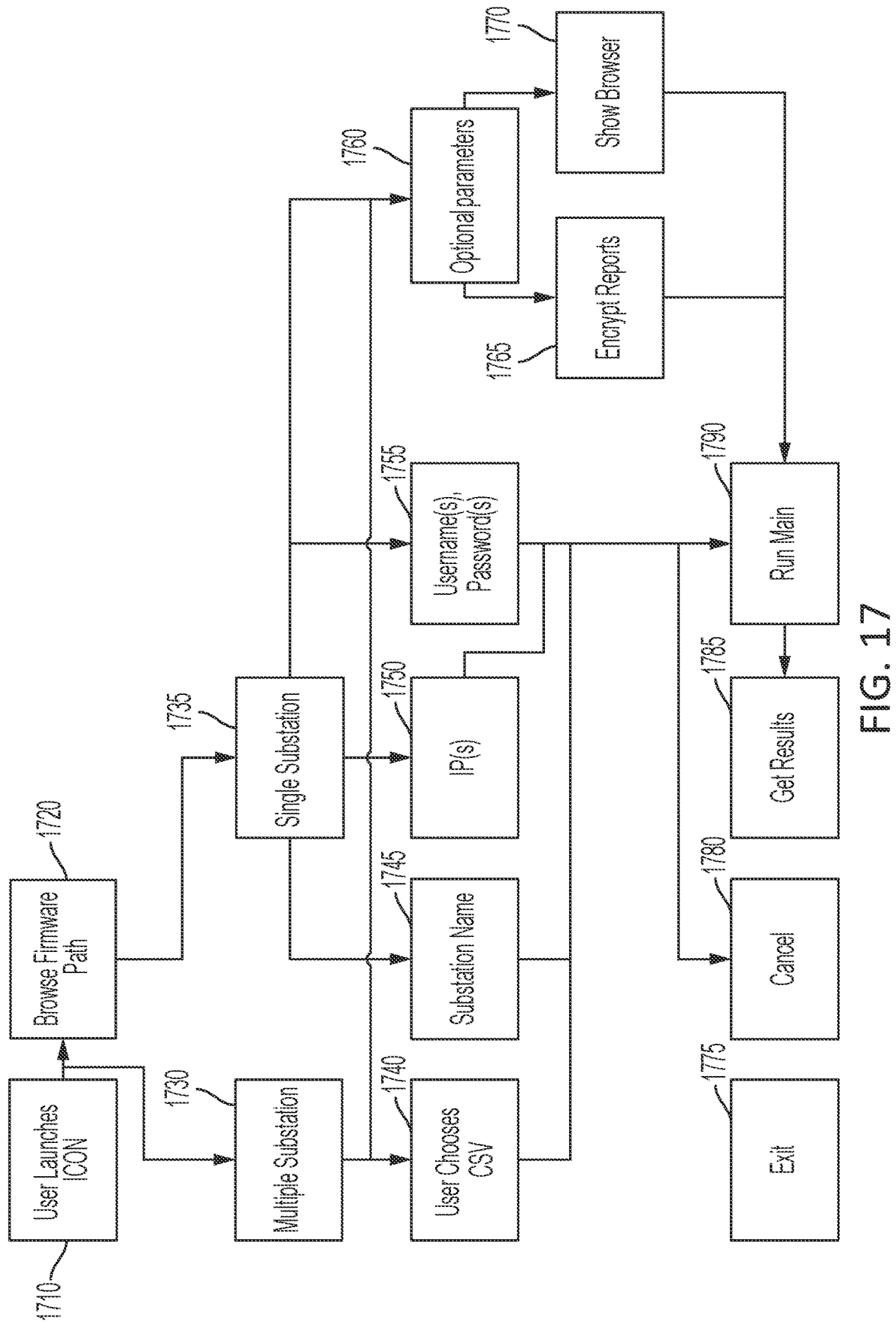
FIG. 17 shows a map of a possible user interface for use with a SCORDTI.

FIG. 17 shows a map of a possible user interface for use with a SCORDTI. The various blocks are referred to as activities and may be configured to be accessed in a variety of ways including by icon and menu selection. Activities may be synonymous with method steps in many cases. In activity 1710, the user may launch the icon for the user interface, typically performed in a graphic user interface. In activity 1720, the user may browse a firmware path to determine where a firmware update is located. The firmware pathway may be for a single substation, such as in activity 1735 or may be for multiple substations, such as in activity 1730. If activity 1730 is accessed, then the user may choose a CSV that will contain a pathway to the various substations in activity 1740. If a single substation is selected, then it may be selected by name in activity 1745 or by IP address in activity 1750. Additionally, in activity 1755 stored passwords may be retrieved for access to the substation. If a single substation is selection then parameters concerning the substation may be retrieved in activity 1760 and reports may be encrypted and generated in activity 1765. Additionally, information may be shown in the browser in activity 1770. In activity 1790 the main actions (main script) for the various subcomponents accessible via the substation may be run and in activity 1785 results may be provided. Additionally, activity 1780 provides for actions to be cancelled and 1775 provides for exiting. This describes a possible GUI design.

Figure 18:
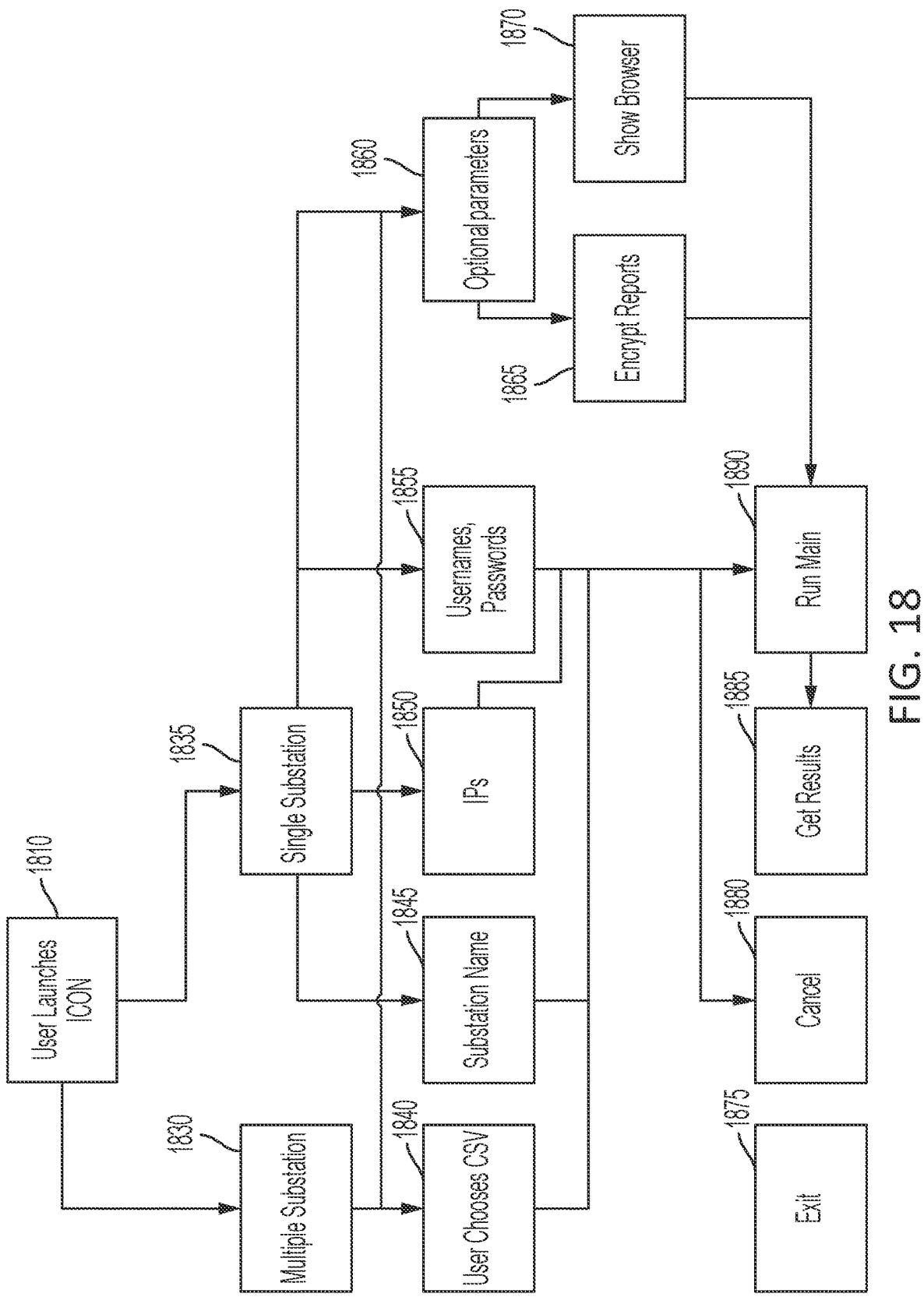
FIG. 18 provides for an embodiment of a password cycle design.

FIG. 18 provides for a password cycle design. This describes the password cycle design. In activity 1810, the user may launch the icon for the user interface, typically performed in a graphic user interface. An activity 1835 for a single substation may be selected or activities for multiple substations may be selected, such as in activity 1830. If activity 1830 is accessed, then the user may choose a CSV that will contain a pathway to the various substations in activity 1840. If a single substation is selected, then it may be selected by name in activity 1845 or by IP address in activity 1850. Additionally, in activity 1855 stored passwords may be retrieved for access to the substation. If a single substation is selection then parameters concerning the substation may be retrieved in activity 1860 and reports may be encrypted and generated in activity 1865 (especially passwords). Additionally, information may be shown in the browser in activity 1870. In activity 1890 the main actions (main script) for the various subcomponents accessible via the substation may be run and in activity 1885 results may be provided. Additionally, activity 1880 provides for actions to be cancelled and 1875 provides for exiting.

Figure 19:
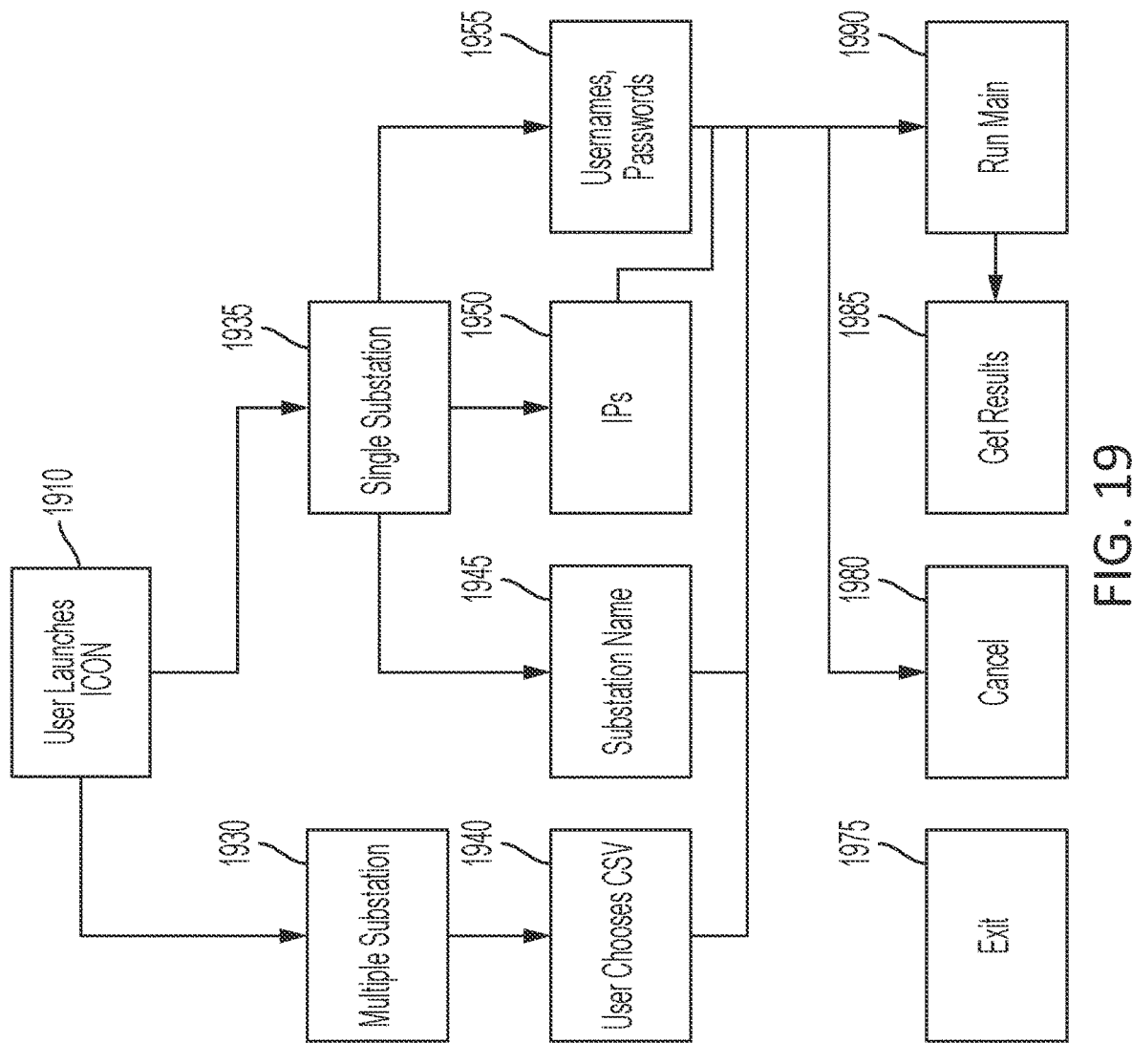
FIG. 19 shows an embodiment of a file retrieval GUI design.

FIG. 19 shows a file retrieval GUI design. In activity 1910, the user may launch the icon for the user interface, typically performed in a graphic user interface. An activity 1935 for a single substation may be selected or activities for multiple substations may be selected, such as in activity 1930. If activity 1930 is accessed, then the user may choose a CSV that will contain a pathway to the various substations in activity 1940. If a single substation is selected, then it may be selected by name in activity 1945 or by IP address in activity 1950. Additionally, in activity 1955 stored passwords may be retrieved for access to the substation. In activity 1990 the main actions (main script) for the various subcomponents accessible via the substation may be run and in activity 1985 results may be provided. Additionally, activity 1980 provides for actions to be cancelled and 1975 provides for exiting.

Figure 20:
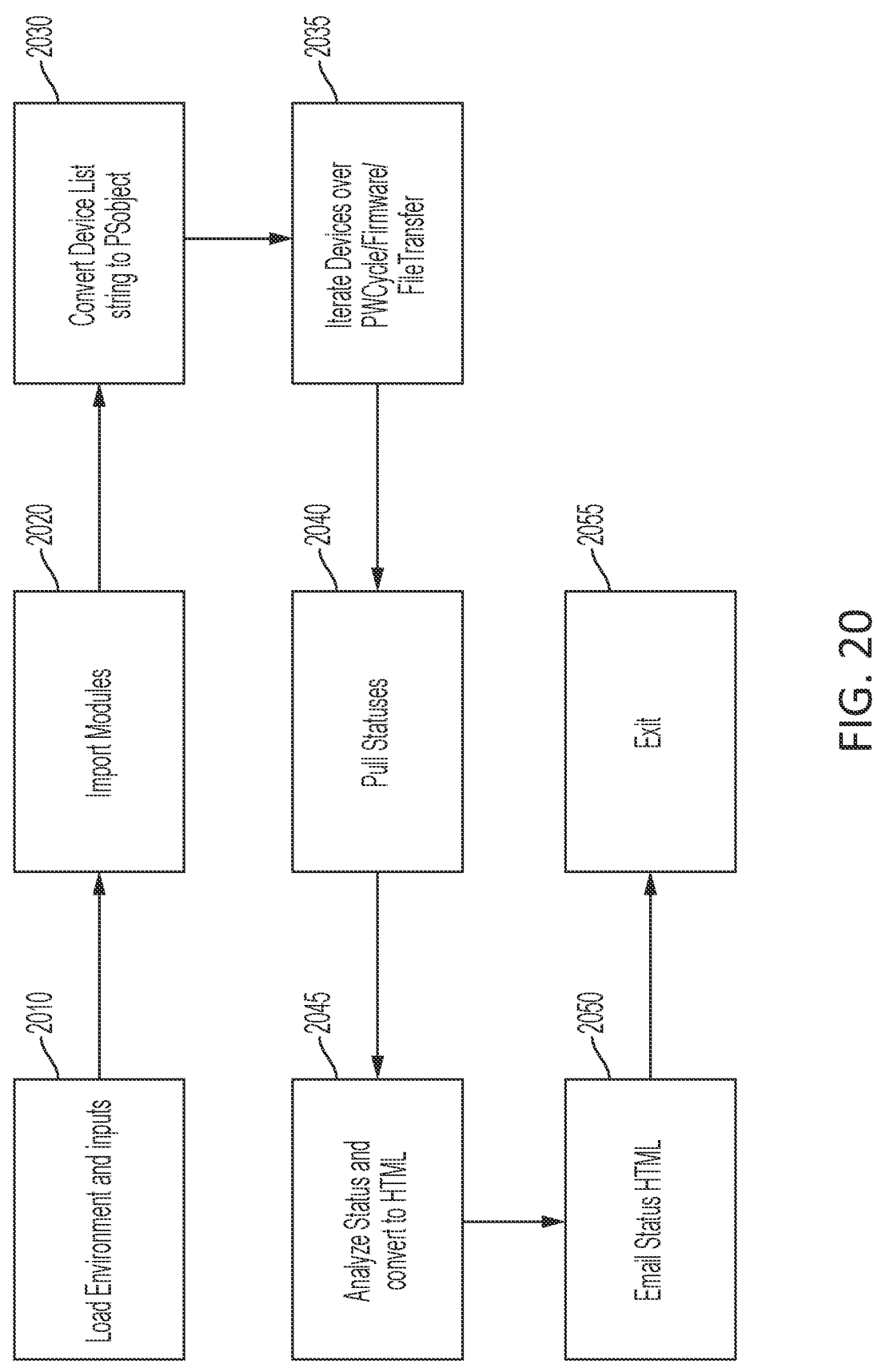
FIG. 20 shows an embodiment of the design of the main script.

FIG. 20 shows an embodiment of the design of the main script. In activity 2010, the environment is loaded and inputs are received. In activity 2020, necessary modules are imported. In activity 2030 the device list string is converted to a PSobject (having key value pairs). In activity 2035, the system iterates the devices for PWcycle (power cycle), firmware update, or file transfer. In activity 2040, the statuses of the various substations may be pulled for completeness. Then in activity 2045, the status is analyzed and converted to HTML. In activity 2050 the status is emailed so the user has a record of what has been done. In activity 2055 the main script exits.

Figure 21:
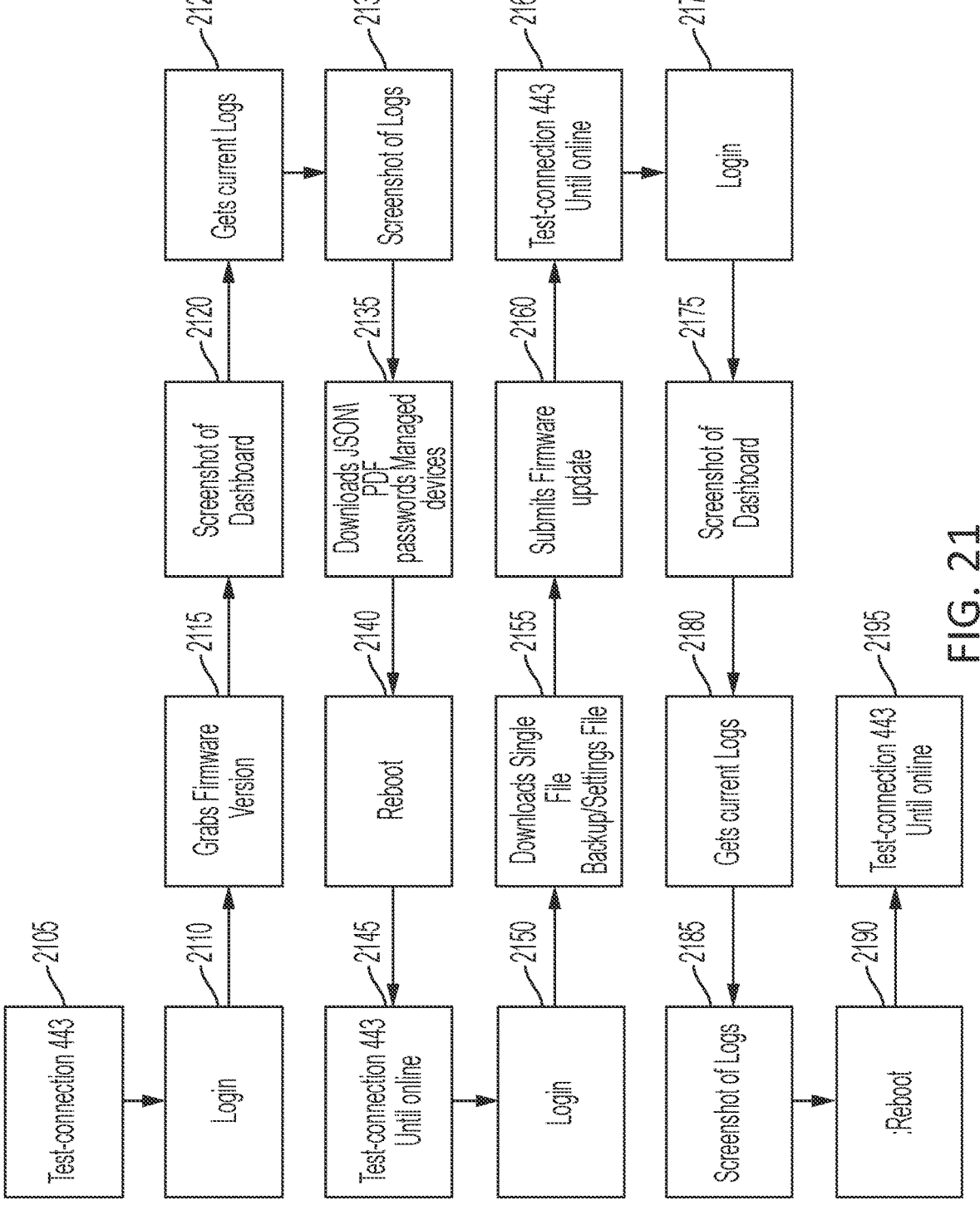
FIG. 21 shows an example of firmware update functionality.

FIG. 21 shows an example of firmware update functionality. In activity 2105, the connection is tested to the device to be updated, typically a SEL gateway. In activity 2110 the system logs in. In activity 2115 the firmware version of the device to be updated is grabbed. In activity 2120 a screen shot of the dashboard of the device is created. In activity 2125 the current logs of the device are accessed. In activity 2130, a screenshot of the logs is created. In activity 2135, the javascript object notation and/or pdf of passwords is downloaded for managed devices. In activity 2140, the device being updated is rebooted. In activity 2145, the connection is tested and the systems waits until the device is online. In 2150 the system logs in again. In activity 2155, the system downloads a single file backup/settings file. In activity 2160, the firmware updated is submitted to the device. In activity 2165, the connection is tested until it comes back online. In activity 2170 the system logs on again. In activity 2175 a screenshot of the dashboard is take to confirm and create a record of the update. In activity 2175 the current logs are accessed. In activity 2185 another screen shot of the logs is created. Inactivity 2190, the system is rebooted and in activity 2195 the connection is tested to make sure the device is online.

Figure 22:
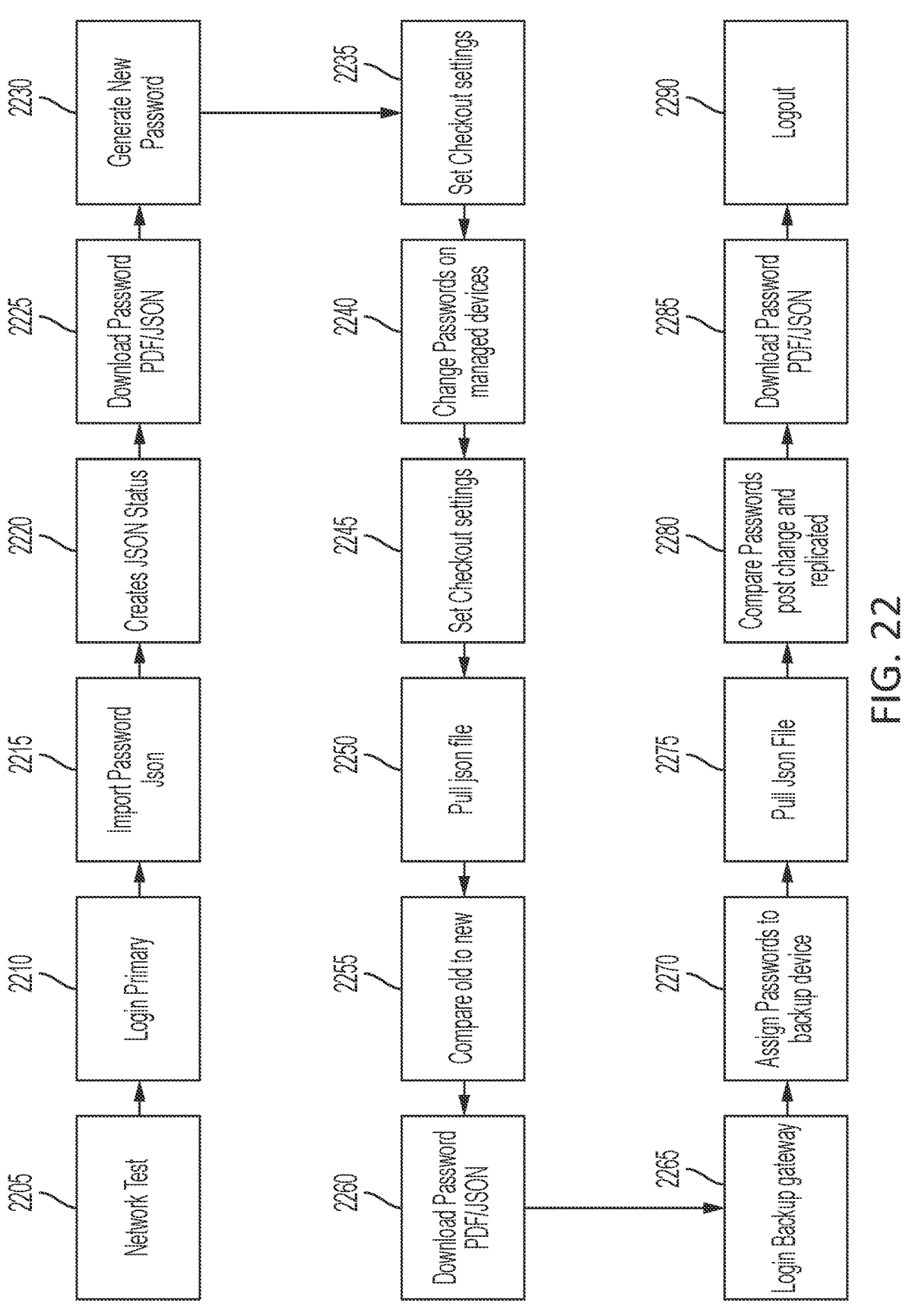
FIG. 22 shows an example of a password update script functionality.

FIG. 22 shows an example of a password update script functionality. In activity 2205 the network for communication for updating of the passwords is checked. In activity 2210, the primary gateway or device is logged into. In activity 2215 the password JSON is imported. In activity 2220, the statues of the JSON is created. Then in activity 2225 the password is downloaded. In activity 2230 a new password is generated. In activity 2235 the checkout settings are set. In activity 2240, the password on the managed devices is changed to the newly generated password. In activity 2245 the checkout settings are set. Then in activity 2250 a JSON file of the password(s) is pulled. In activity 2255 the old password is compared to the new. In activity 2260 the new password is downloaded. In activity 2265 the system logs into the backup gateway. In activity 2270 passwords are assigned to the backup device. In 2275 a JSON file of this backup is pulled. In activity 2280, the passwords are compared post change. In activity 2285, the password pdf/JSON is downloaded. In 2290 the script comes to an end and logs out.

Figure 23:
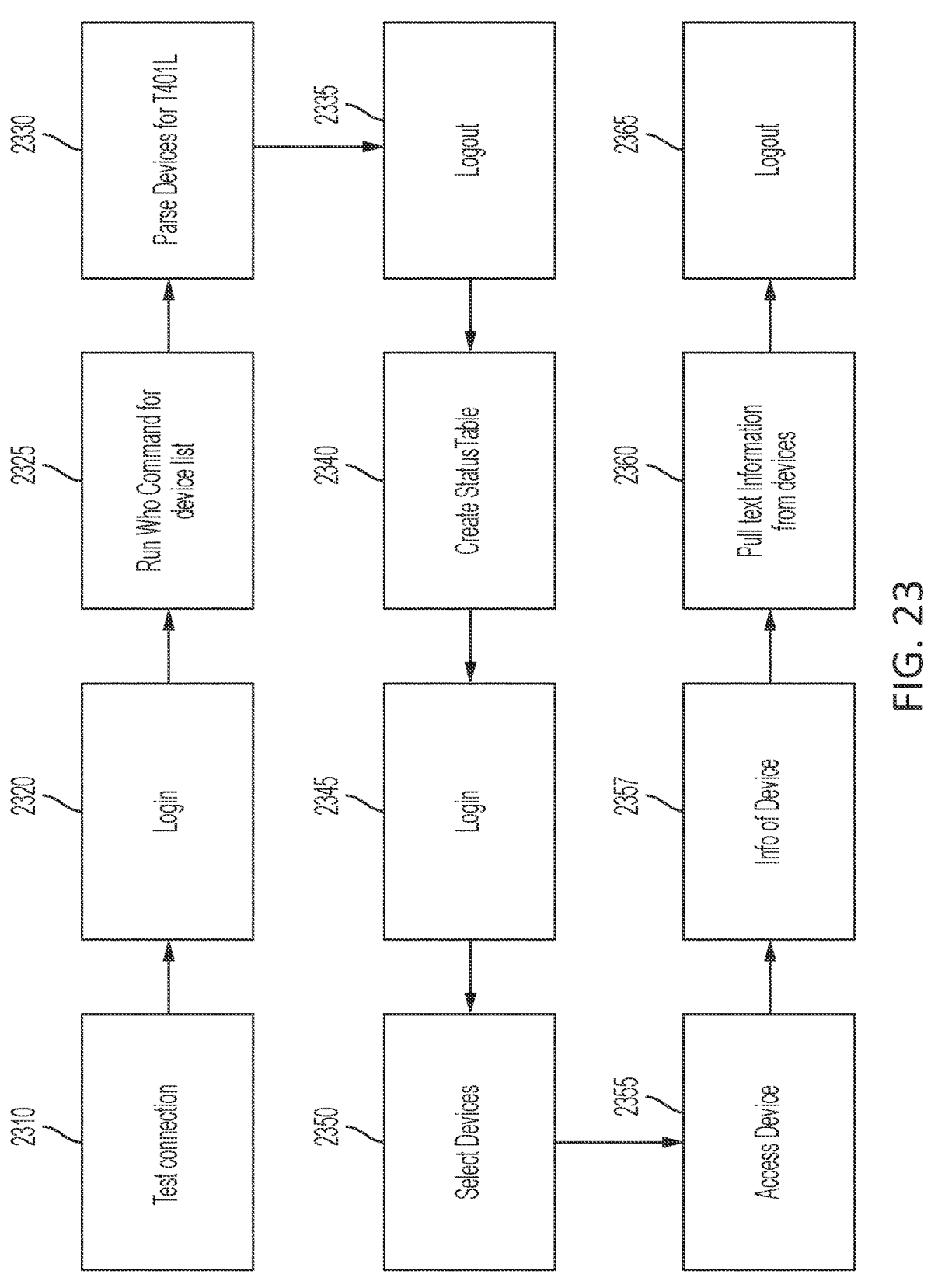
FIG. 23 shows an embodiment of a file transfer functionality map.

FIG. 23 shows a file transfer functionality map. In activity 2320, the system logs in. In activity 2325, the system runs a "who" command for the device list. In activity 2330 the device list is parsed for T401L. This is a particular model number for the SEL device that is updatable. Various other searches may occur here according to the device of interest. In 2335, the system logs out. In 2340, a status table is created concerning the device and model number. In activity 2340, the system logs in. In activity 2350, the devices for file transfer are selected. In activity 2355, the device or devices are accessed. In activity 2360, information concerning the device is retrieved. In activity 2360, textual information is pulled from the devices for recording, analysis, or sanding. In activity 2365 the system logs out.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof. In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

We claim:

1. A system for controlling disparate remote devices, the system comprising:
a control module, the control module providing a standardized interface to a user, the standardized interface providing a plurality of activities, the plurality of activities including update access credentials, wherein the access credentials include login by a user using the protocol of the terminal, wherein the control module is configured to and executes commands causing the control module:
to communicate with a remote device, the remote device providing a remote-control interface having one or more interface types, selected from a list consisting of graphical user interface, command line interface, and menu driven interface;
to simulate direct user interaction with the remote-control interface, translating a standardized command specifying an activity of the plurality of activities received via the standardized interface to a translated command, the translated command simulating direct user interaction with the one or more interface type, the translated command generated based on the actions taken by a previous user in relation to a particular remote device to which the standardized command relates.

2. The system of claim 1, wherein the remote device is a gateway on a power grid.

3. The system of claim 1, wherein the remote device is an IoT gateway.

4. The system of claim 2, wherein the gateway collects information on energy distribution.

5. The system of claim 2, wherein the translated command simulates remote access of the user via one of a graphical user interface, command line interface, or a menu driven interface.

6. A method of controlling disparate remote devices, the method comprising:
providing a standardized interface to a user through a control module, the standardized interface providing a plurality of activities, the plurality of activities including update access credentials, wherein the access credentials include login by a user using the protocol of the terminal;
communicating via the control module with a remote device, the remote device providing a remote-control interface having one or more interface types, selected from a list consisting of graphical user interface, command line interface, and menu driven interface;
simulating direct user interaction with the remote-control interface by translating a standardized command specifying an activity of the plurality of activities received via the standardized interface to a translated command, the translated command simulating direct user interaction with the one or more interface type, the translated command generated based on the actions taken by a previous user in relation to a particular remote device to which the standardized command relates.

7. The method of claim 6, wherein the remote device is a gateway on a power grid.

8. The method of claim 6, wherein the remote device is an IoT gateway.

9. The method of claim 7, wherein the gateway collects information on energy distribution.

10. The method of claim 7, wherein the translated command simulates remote access of the user via one of a graphical user interface, command line interface, or a menu driven interface.

11. A system for controlling disparate remote devices, the system comprising:
a control module, the control module providing a standardized interface to a user, the standardized interface providing a plurality of activities, the plurality of activities including update access credentials, wherein the access credentials include login by a user using the protocol of the terminal, wherein the control module is configured to and executes commands causing the control module:
to communicate with a first remote device, the first remote device providing a first remote-control interface having a first one or more interface types, selected from a list consisting of graphical user interface, command line interface, and menu driven interface;
to simulate a first direct user interaction with the first remote-control interface, translating a first standardized command specifying an activity of the plurality of activities received via the standardized interface to a first translated command, the first translated command simulating direct user interaction with the first one or more interface type;
to communicate with a second remote device, the second remote device providing a second remote-control interface having a second one or more interface types, selected from the list consisting of graphical user interface, command line interface, and menu driven interface;
to simulate a second direct user interaction with the second remote-control interface, translating the first standardized command specifying the activity of the plurality of activities received via the standardized interface to a second translated command, the second translated command simulating direct user interaction with the second one or more interface type, the second translated command generated based on the actions taken by a previous user in relation to a particular remote device to which the second translated command relates.

12. The system of claim 11, wherein the remote device is a gateway on a power grid.

13. The system of claim 11, wherein the remote device is an IoT gateway.

14. The system of claim 12, wherein the gateway collects information on energy distribution.

15. The system of claim 12, wherein the translated command simulates remote access of the user via one of a graphical user interface, command line interface, or a menu driven interface.

16. The system of claim 11, wherein the first remote device and the second remote device are designated to be communicated with in response to a selection of an activity of the plurality of activities according to a list associated with the activity.

17. The system of claim 16, wherein the first one or more interface types and the second one or more interface types are the same and the list provides for a repetition of simulating direct user action.

18. A method of controlling disparate remote devices, the method comprising:

providing a standardized interface to a user through a control module, the standardized interface providing a plurality of activities, the plurality of activities including update access credentials wherein the access credentials include login by a user using the protocol of the terminal;

communicating via the control module with a first remote device, the first remote device providing a first remote-control interface having a first one or more interface types, selected from a list consisting of graphical user interface, command line interface, and menu driven interface;

simulating direct user interaction with the first remote-control interface by translating a first standardized command received via the standardized interface to a first translated command;

the first translated command simulating direct user interaction with the first one or more interface type;

communicating via the control module with a second remote device, the second remote device providing a second remote-control interface having a second one or more interface types, selected from the list consisting of graphical user interface, command line interface, and menu driven interface;

simulating direct user interaction with the second remote-control interface by translating the first standardized command received via the standardized interface to a second translated command, the second translated command simulating direct user interaction with the second one or more interface type, the second translated command generated based on the actions taken by a previous user in relation to a particular remote device to which the second translated command relates.

19. A system for teaching a standardized interface to control disparate remote devices, the system comprising:

a control module, the control module providing a standardized interface to a user, the standardized interface providing a plurality of activities, the plurality of activities including update access credentials, wherein the access credentials include login by a user using the protocol of the terminal, wherein the control module is configured to and executes commands causing the control module:

to communicate with a remote device, the remote device providing a remote-control interface having one or more interface types, selected from a list consisting of graphical user interface, command line interface, and menu driven interface;

to simulate direct user interaction with the remote-control interface, translating a standardized command specifying an activity of the plurality of activities received via the standardized interface to a translated command, the translated command simulating direct user interaction with the one or more interface type;

wherein the control module is further configured to enter into an activity teaching mode, the activity teaching mode providing a teaching interface to the user, the teaching interface configured to:

receive a request for a new remote device to be added;

activate a teaching record, wherein the user navigates the new remote device via a new remote-control interface and the activity teaching module configures the control module to perform at least one of the plurality of activities at the new remote device based on actions of the user in relation to the new remote-control interface.

* * * * *